United States Patent [19]

Wade et al.

[11] 4,296,667
[45] Oct. 27, 1981

[54] CAPTURE COMBINATION ACTION SYSTEM FOR ELECTRONIC ORGANS

[75] Inventors: David R. Wade, Cincinnati, Ohio; Walter Munch, Ft. Thomas, Ky.

[73] Assignee: Baldwin Piano & Organ Company, Cincinnati, Ohio

[21] Appl. No.: 121,591

[22] Filed: Feb. 14, 1980

[51] Int. Cl.³ .................... G09B 15/00; G10B 3/10
[52] U.S. Cl. .................................. 84/345; 84/370; 84/477 R
[58] Field of Search ...................... 84/343–345, 84/369, 370, 477 R

[56] References Cited

U.S. PATENT DOCUMENTS

| | | | |
|---|---|---|---|
| 3,103,847 | 9/1963 | Raymond | 84/345 |
| 3,422,718 | 1/1969 | Noehren | 84/345 |
| 3,449,995 | 6/1969 | Sepp, Jr. | 84/345 |
| 3,498,168 | 3/1970 | Cunningham | 84/345 |
| 3,659,488 | 5/1972 | Deutsch | 84/345 |
| 3,686,994 | 8/1972 | Badessa | 84/345 |
| 3,926,087 | 12/1975 | Griffis | 84/345 |
| 4,006,658 | 2/1977 | Kappes et al. | 84/345 |
| 4,157,049 | 6/1979 | Watanabe | 84/345 X |
| 4,157,051 | 6/1979 | Peterson et al. | 84/343 |

Primary Examiner—Stanley J. Witkowski
Attorney, Agent, or Firm—Frost & Jacobs

[57] ABSTRACT

A microprocessor controlled electronic capture combination action system for use in an electronic organ for selecting a predetermined combination of stops to define the organ voicing. The system includes a plurality of stop tabs for setting and resetting the stops, a plurality of pistons for setting a desired combination of stops to a predetermined condition, a random access memory for storing data associated with a selected combination of stops, a read only memory containing a permanently stored operating program incorporating a plurality of operating instructions, an indicator light associated with each of the stop tabs and a microprocessor responsive to the operating instructions. The stop tab and pistons are continually and sequentially scanned to detect the contact closures. Actuated stop tabs cause the associated stops to be selected and the indicator lights illuminated. Information corresponding to a selected combination of stops for a selected one of the pistons is stored in the random access memory and may be recalled at will by closing the appropriate piston. The recalled data is used to select the combination of stops and illuminate the associated indicator lights.

The system also includes a manually operable crescendo shoe which may be used to actuate a plurality of predetermined combinations of the stops in response to designated positions of the shoe. In a preferred embodiment, a crescendo circuit is used to cause a delayed interrupt signal to the operating program to provide a count which is compared against stored values associated with particular stop combinations. The crescendo shoe also includes a circuit for adding hysteresis to the crescendo shoe position.

The operating program incorporates a debounce routine for eliminating false contact closures caused by switch bounce in the stop tabs such that the switch contacts must remain in a particular state for a number of successive scans before the switch closure will be detected.

26 Claims, 9 Drawing Figures

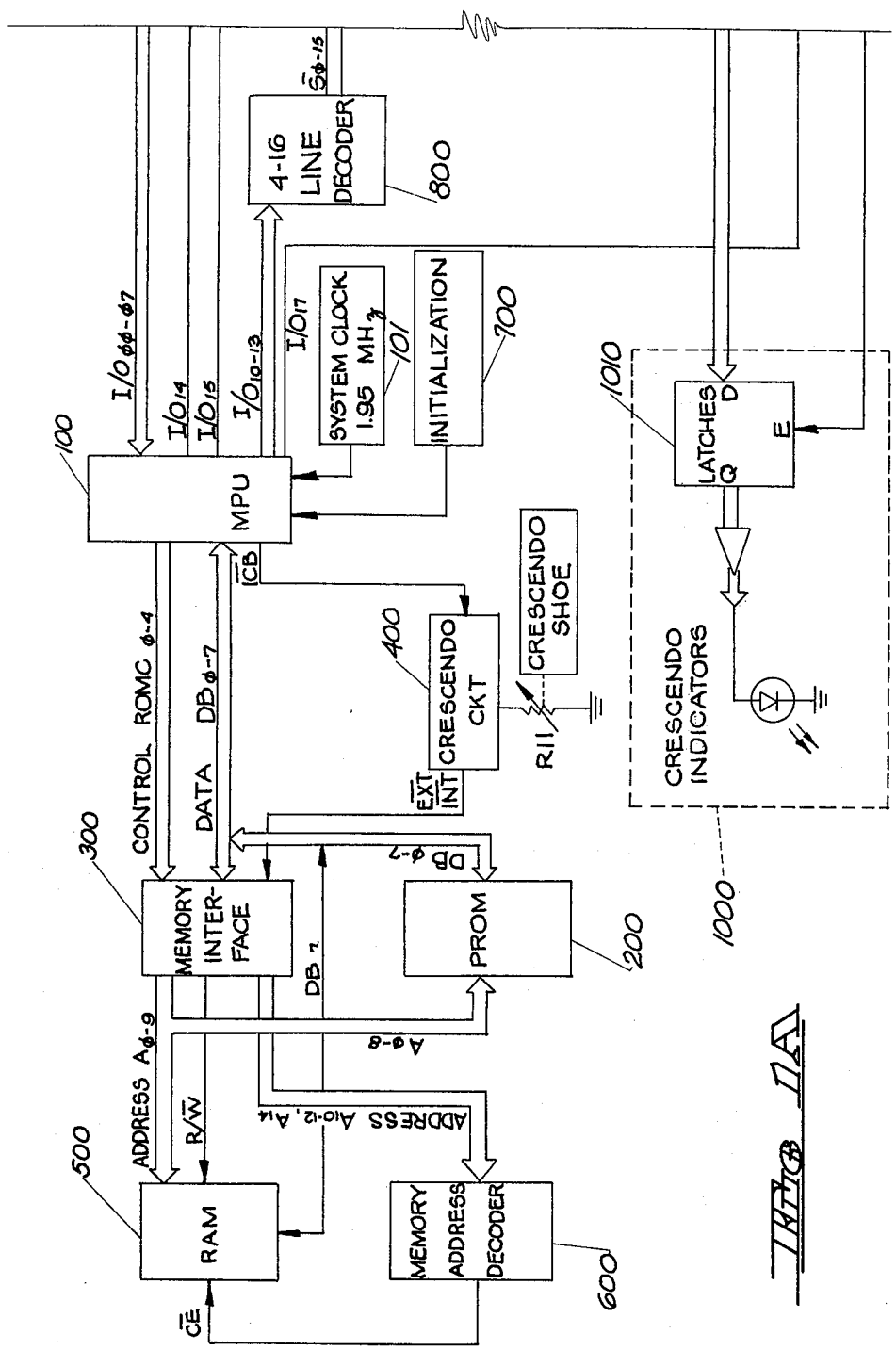

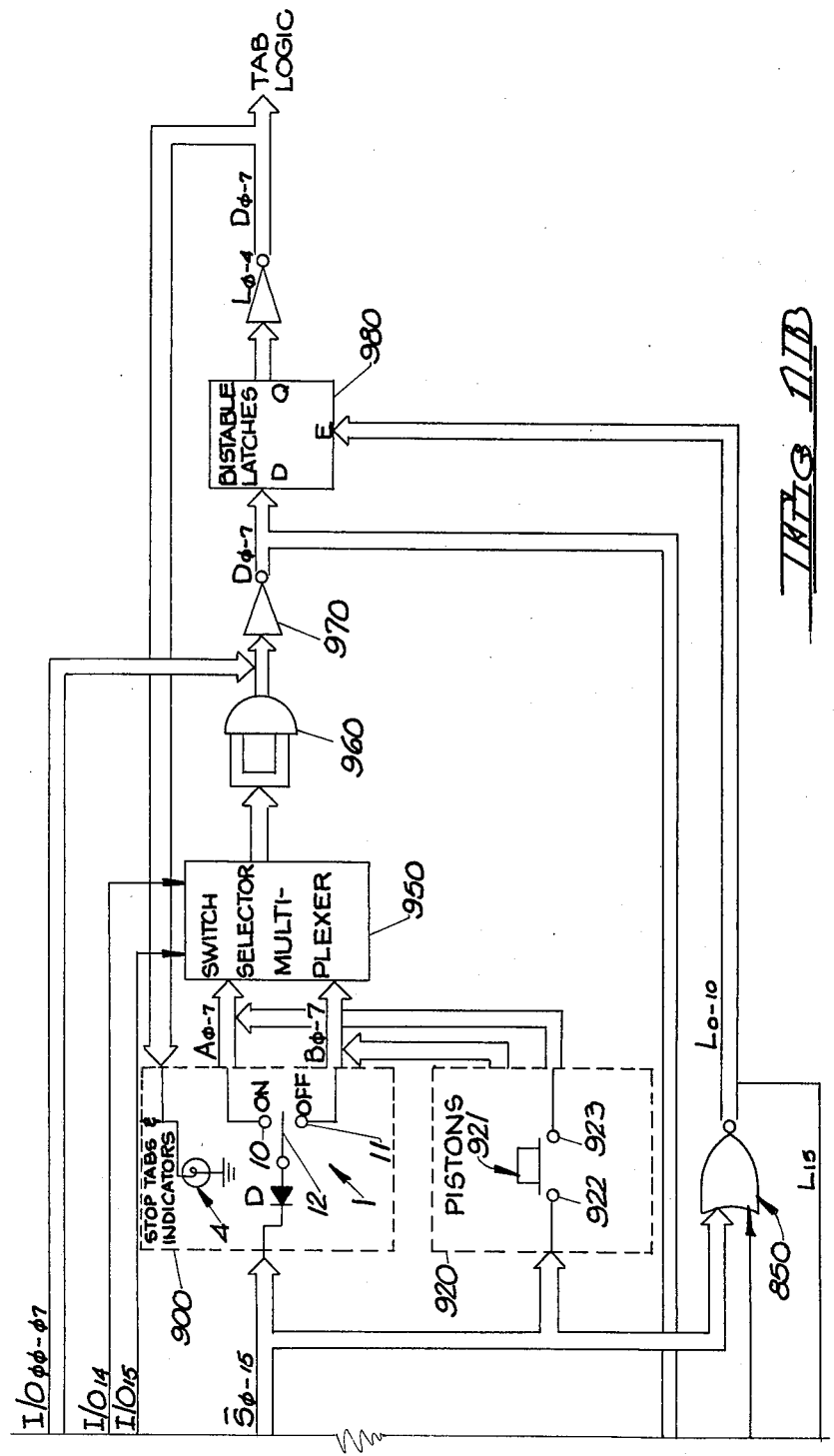

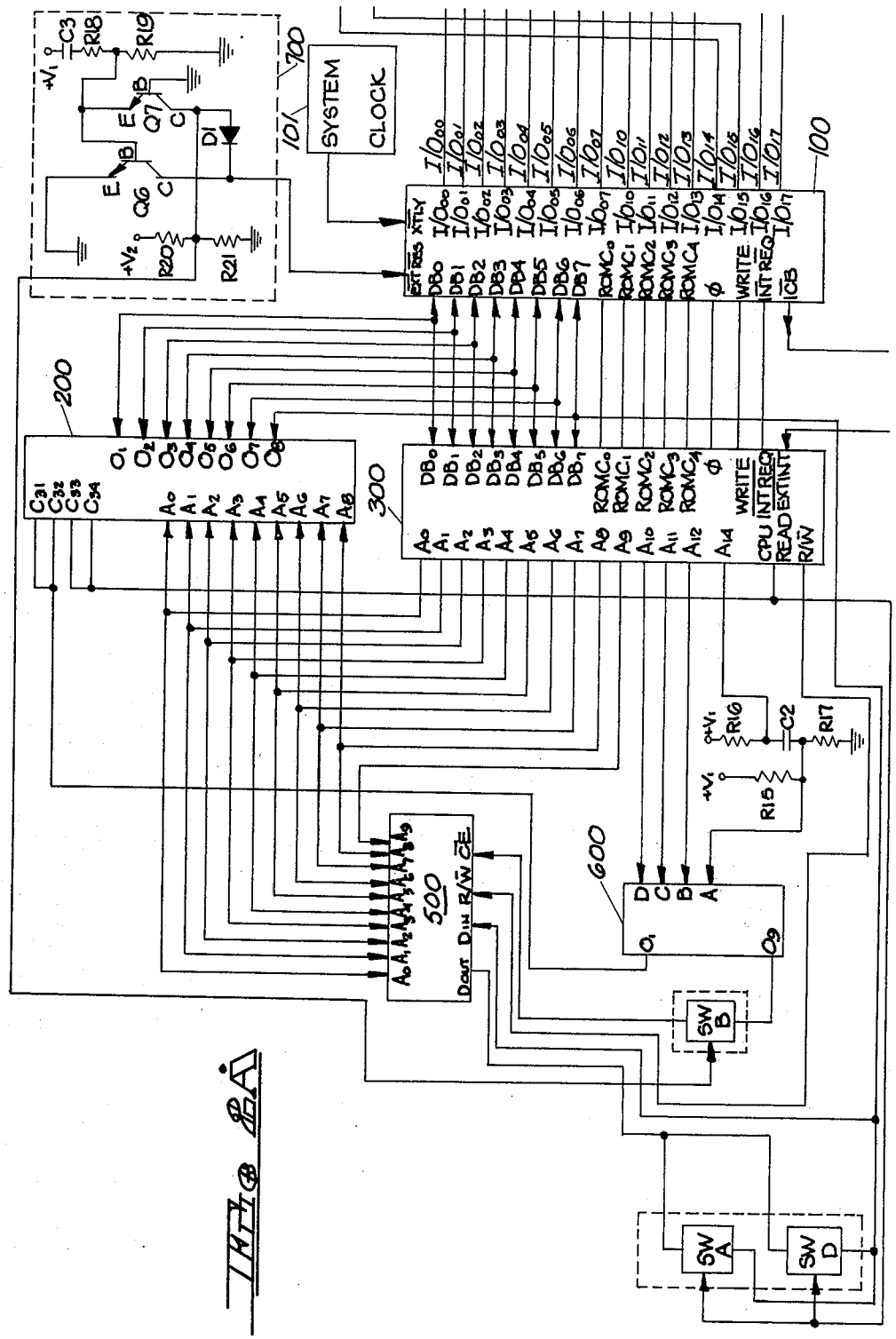

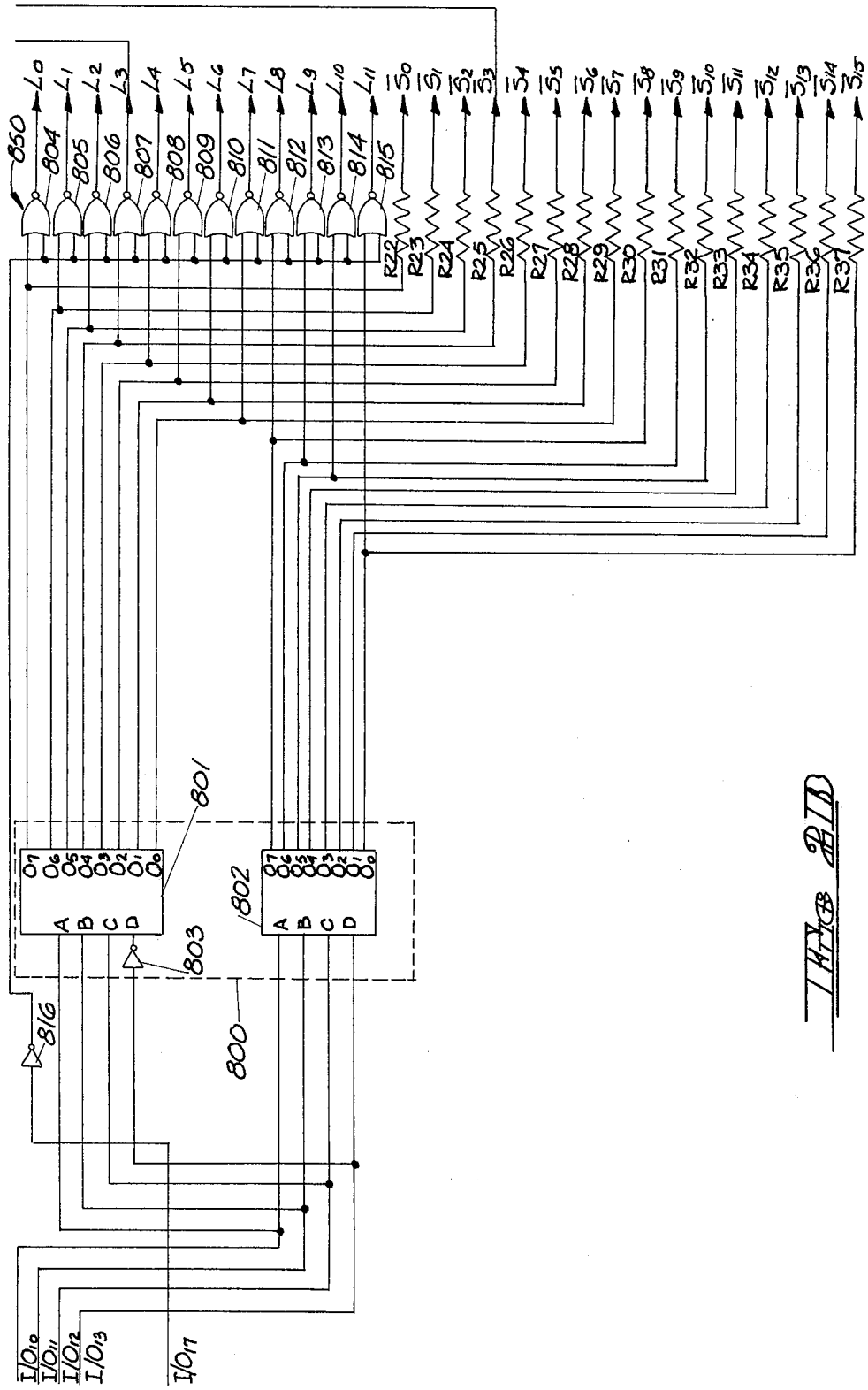

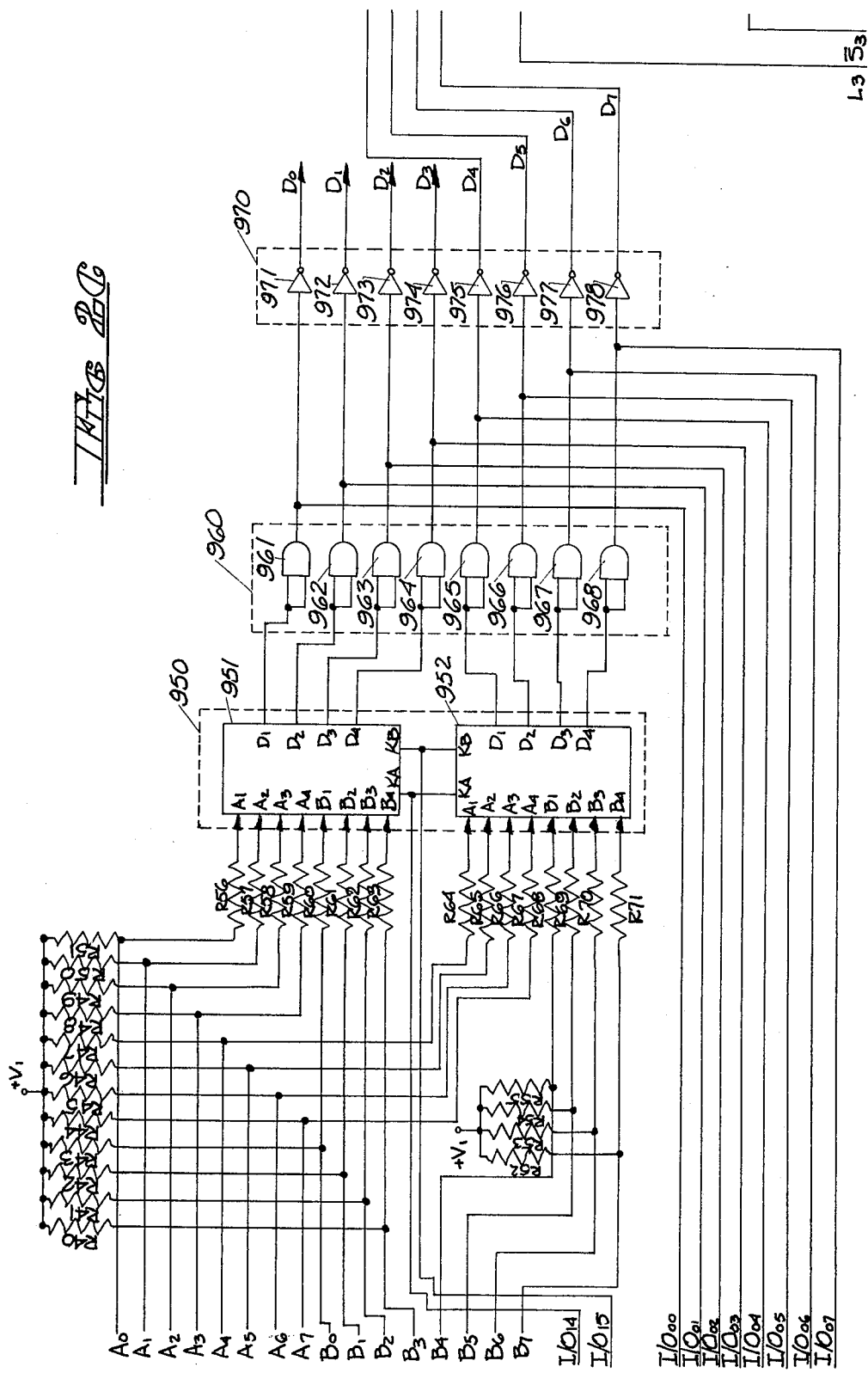

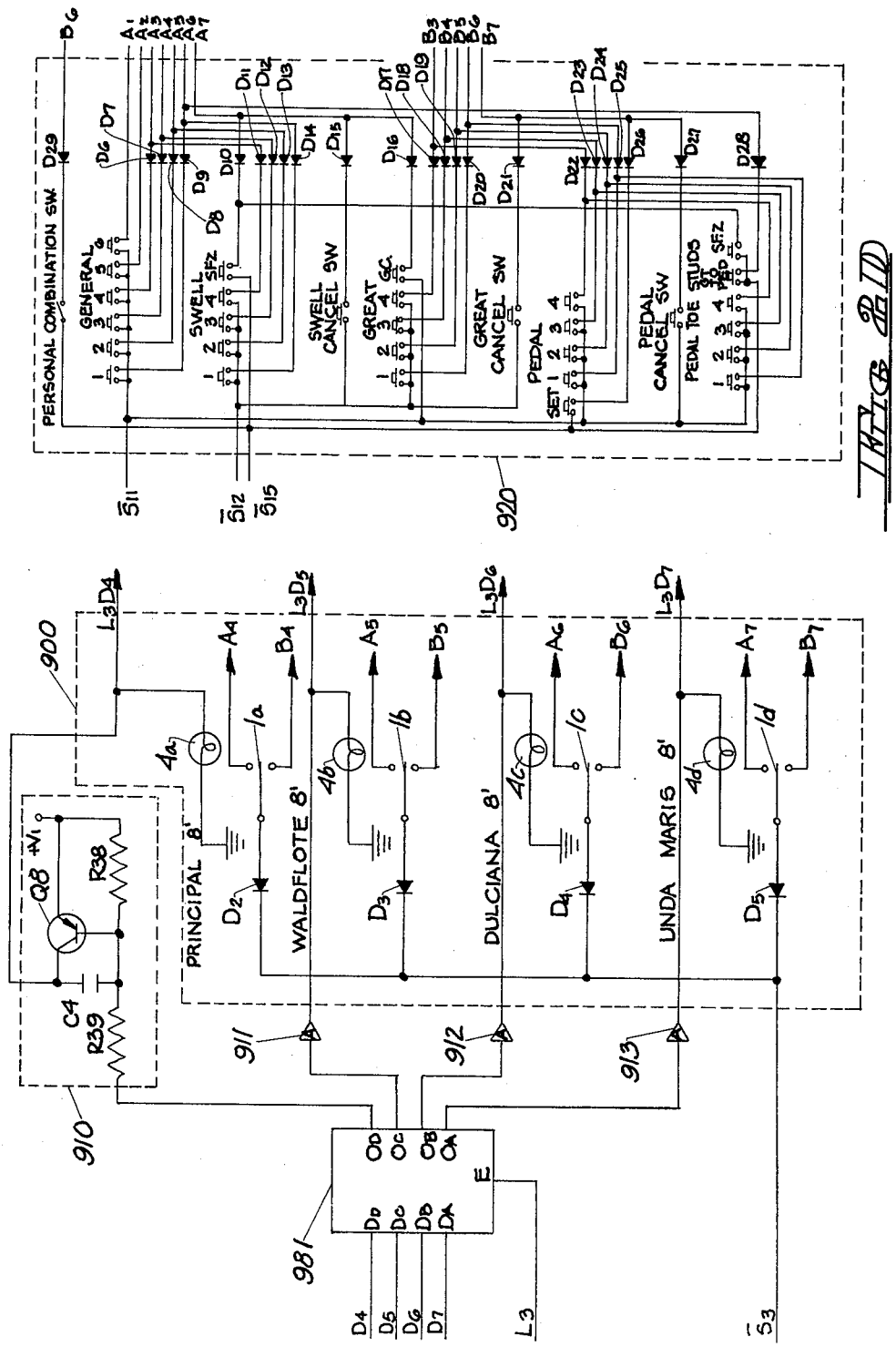

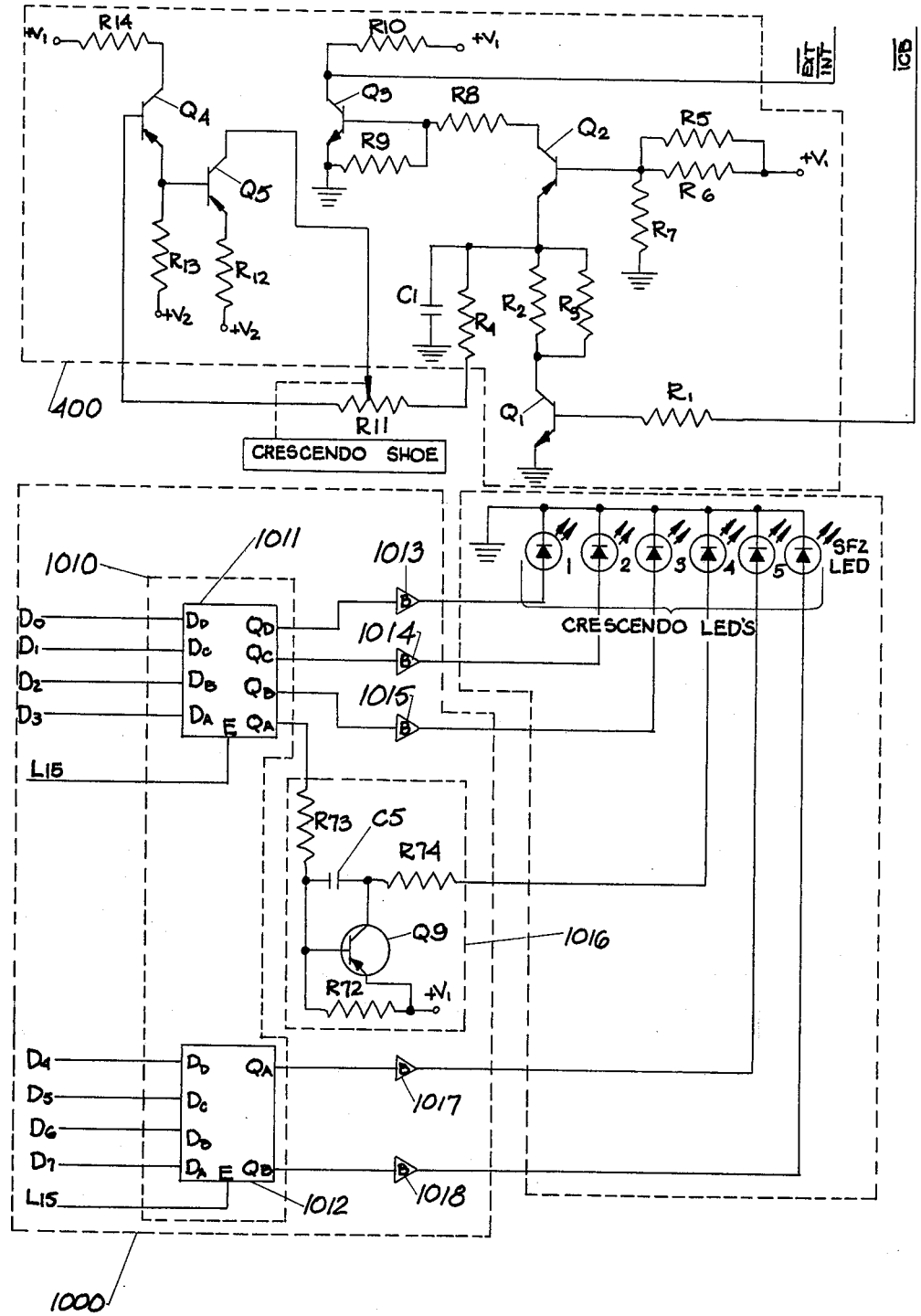

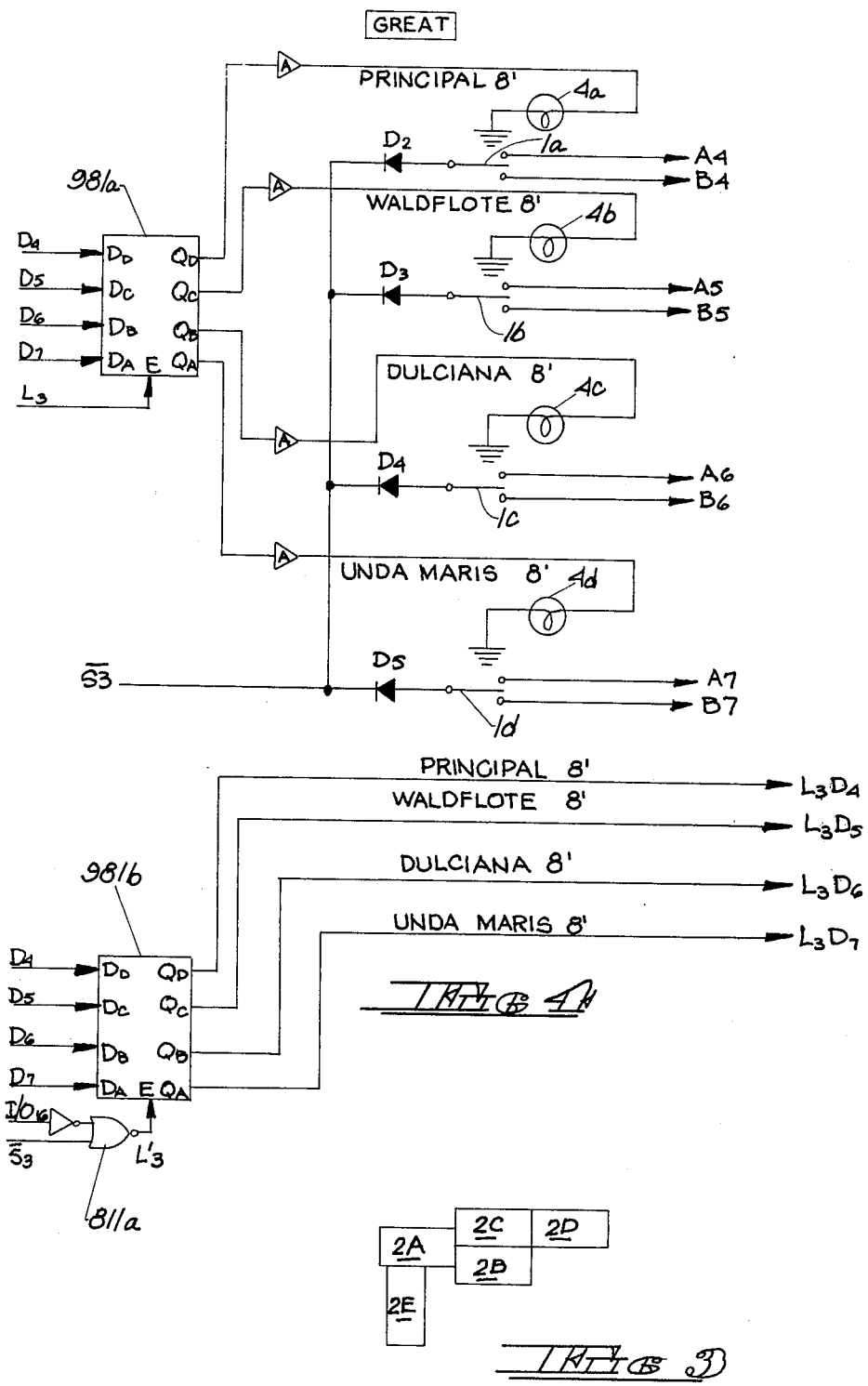

CAPTURE COMBINATION ACTION SYSTEM FOR ELECTRONIC ORGANS

SUMMARY OF THE INVENTION

This invention relates to electronic organs and more particularly to a capture combination action system used in an electronic organ.

Over the years a wide variety of systems have been developed for controlling organ stops to permit the performer to change the stop combination on the instrument including capture combination systems in which the stop combination may be quickly changed to another previously set combination by merely depressing a switch control, such as a thumb piston or toe stud. In the conventional approach, when the thumb piston or toe stud is depressed, the stop tabs to be activated by the particular piston or toe stud in question are moved to the "on" state by either purely mechanical or electromechanical means. Such movement not only provides the obvious function of energizing the required stops, but the "on" position of the stop tab also provides a visual indication to the performer as to which of the stops have been energized. In this type of capture system the operator can easily program or set any combination of stops desired into any piston by manually turning on the appropriate stops, and simultaneously holding the "set" piston and the piston or toe stud into which the combination is to be programmed. With this arrangement, the selected combination will then be activated whenever that particular piston or toe stud is again depressed.

Capture combination systems of the character described have a number of disadvantages, among which are cost effectiveness, speed of action, and ease of operation. In the modern electronic organ the stop switches, which are the ones directly controlled by the drawbar or stop tab mechanism, control a minute amount of power, typically in the milliwatts range. By contrast, the power supplied to the solenoid-activated draw knob or stop tab mechanism to control the stop switch is in the tens of watts range. Thus, tens of watts of power are required to control a few milliwatts of power, which is an extremely inefficient arrangement from the standpoint of the amount of power required to operate the system. In addition, the system is expensive in terms of the cost of the solenoids used in the mechanisms as well as the power switching electronics and power supply required to drive the solenoids. Another major disadvantage of such systems is their sluggish operation and the presence of mechanically produced noise which can be of substantial magnitude when numerous stops are simultaneously actuated.

Generally, each operational piston permits actuation of a selected group of stops when that piston is actuated, thereby permitting selection of any of a number of combinations of stops in accordance with actuation of the corresponding ones of the pistons. The pistons generally are grouped in various categories identified by their control capabilities. Divisional pistons, for example, are associated with a corresponding division and provide for control of only those voice stops and couplers associated with that same division. Independent general pistons, on the other hand, provide for control of a combination of all of the stops provided in the organ simultaneously regardless of the relationship of groups of those stops to specific divisions.

In general, combination systems include a memory for recording the combination of stops associated with each piston. Upon actuation of a piston, the combination system sets the corresponding stops as indicated by the stored information in memory. Numerous techniques have been proposed for combination system memories including mechanical linkages, electrical bar-switches, and computer electrical memories. Preset combination systems are those in which the memory is hard-wired so that changes may be made only by rewiring a terminal located inside the console. The stop combinations cannot be changed by the organist from the front of the console. In a setter board system, a wire associated with each stop is connected to a switch or jumper jack. A row of switches is provided for each divisional piston so that the memory is set by moving the switches to the desired on or off positions. Generally, a large number of such switches is required in a setter board system.

A capture combination system permits the organist to set information into a combination memory by means of the conventional organ controls. For example, with regard to the swell division, a combination of stops is selected which produces a desired tonal effect for each of the pistons of that division. The stop combination information is then placed into memory by depressing a set piston, and simultaneously pressing an available piston of that division. Subsequently, whenever that divisional piston is depressed, the stops of the preselected combination captured in the operation with the set piston are turned on or set.

In U.S. Pat. No. 3,103,847, issued Sept. 17, 1963, to C. A. Raymond, a capture-type combination action is described where the stop actuating members are mechanically connected by means of complex mechanical linkages to electro-mechanically operated solenoids which set or reset selected combinations of stops.

A setter board arrangement is illustrated in U.S. Pat. No. 3,422,718, issued Jan. 21, 1969 to R. G. Noehren. In this arrangement, a stop combination setter determines the stop combinations for each piston in accordance with a selected combination data storage media such as a patch board, punched card or tape, magnetic card, etc. The stop tabs themselves are actuated by electromechanical solenoids to provide a visual indication to the organist of the stops that have been selected.

A more sophisticated setter board arrangement is illustrated in U.S. Pat. No. 4,157,051, issued Jan. 5, 1979 to Peterson et al. This arrangement uses specially constructed key tab switches biased to return to a neutral position, which are depressed to set an electronic latch circuit, thereby energizing an associated LED indicator mounted on the stop tab and turning on the associated stop. Preset pistons toggle preselected latching circuits to the ON position by means of diode gates preselected by a matrix of separate toggle switches similar to a setter board system. However, a desired combination of stops cannot be captured and set from action of the stop tabs themselves with this arrangement.

U.S. Pat. No. 3,449,995, issued June 17, 1969, to O. W. Sepp, Jr., uses a plastic or metallic preselector index card for programming the selected stops. When the particular combination is called, the stop tabs are physically moved to the ON position by means of electromechanical solenoids.

In U.S. Pat. No. 3,498,168, issued Mar. 3, 1970 to T. W. Cunningham, the stop combinations are stored in a magnetic core memory, and the stop tabs are physically moved to the ON position by means of electro-mechanical solenoids. A similar arrangement is shown in U.S. Pat. No. 3,686,994, issued Aug. 29, 1972 to R. S. Badessa.

In U.S. Pat. No. 3,659,488, issued May 2, 1972 to R. Deutsch, the piston and stop switches are scanned under control of a central processing unit to detect actuation of individual ones of the pistons and associated stops. This information is gated into a temporary memory, and eventually stored in an external physical memory such as a magnetic card, punched paper tape or cassette recorder. The information pertaining to the selected combination must be read into the apparatus from the external memory. The piston matrix is initially scanned at a relatively high speed, with the information from each line of the stop matrix read out in succession at a relatively low speed. The stop tabs selected are physically moved to the ON position to provide a visual indication of the selected stops.

A similar arrangement is illustrated in U.S. Pat. No. 3,926,087, issued Dec. 16, 1975 to S. W. Griffis. In this arrangement, a piston closure causes a central processing unit to select a particular preselected combination of stops from a list contained in a read only memory. However, a separate piston is required for each preselected stop combination inasmuch as the combinations cannot be set from the stop tabs themselves. Furthermore, when selected, the stops are physically moved to the activated position by means of electro-mechanical solenoids.

The organ capture action of U.S. Pat. No. 4,006,658, issued Feb. 8, 1977 to Kappes et al., uses a 23 channel recirculating shift register to store information concerning the combination of stop tabs to be selected. The stop tabs are physically moved to the activated position by means of actuating coils multiplexed at a 60 Hz rate.

U.S. Pat. No. 4,157,049, issued June 5, 1979 by H. Watanabe, also utilizes a shift register to store piston data. Activation of a particular piston causes the programmed combination of stop tabs to be physically moved to the activated position. This system also utilizes a crescendo control which produces a digital code by means of a multiple pole switch to address a crescendo registration memory for activating the appropriate combination of stops and indicating lights.

The capture combination system of the present invention utilizes stop tabs or stop controls of the momentary-acting type in which the organist depresses the tab to turn on the stop, after which the tab automatically returns to a center rest or neutral position. The organist turns the tab off by deflecting the tab upwardly, after which the tab again automatically returns to the center rest position. The tabs are thus moved by the same motions that the organist uses with conventional detent-type tongue tabs. When the tab is depressed to turn on the stop, an indicator light adjacent the stop tab is turned on to give the organist a visual indication that the stop is "ON", and the indicator light is extinguished when the stop tab is momentarily moved to the "OFF" position.

Signal processing in the present invention is under the control of a microprocessor unit operating from a control program stored in a read only memory. All of the the controls associated with the musical instrument such as stop tabs, thumb pistons, toe studs and the crescendo shoe, are continually and sequentially scanned by the microprocessor unit. When one of these controls is activated, this condition is sensed by the microprocessor unit which provides suitable control outputs to the particular stop circuits required by the function of the control activated, and to the indicator circuits for providing a visual indication of the stops selected.

This capture system permits the organist to easily program or set any combination of stops desired. The information relating to the combination of stops selected is stored in a random access memory under control of the microprocessor unit. In addition, the stored information may be called as desired from the random access memory by means of the pistons or toe studs to set the desired combination of stops. It will be observed that a visual indication is provided to the organist for the stops selected by means of indicator lights, so that the stop tabs themselves are not physically moved from the center rest position by the capture combination action. Furthermore, the program stored in the read only memory contains a debouncing program to insure that false switch closures caused by mechanical bounce or the like do not cause erroneous indications or selections of the organ voice circuits.

The present invention also uses a crescendo circuit which operates in association with the crescendo shoe to control the execution of a crescendo program stored in the read only memory, and consequently the actuation of the stop combinations associated with each position of the crescendo shoe. In the preferred embodiment described, the crescendo circuit incorporates a delay circuit responsive to the setting of the crescendo shoe, which causes an interrupt request to be delayed to the microprocessor unit, and a count established proportional to the crescendo shoe position. The magnitude of this count is compared with the values assigned to various ones of the stops stored in a data table, resulting in the stops having values associated with particular count values being actuated. With the crescendo shoe in the closed position, the time delay involved is short, causing the count value to be substantially zero so that no stops are actuated. However, as the crescendo shoe is further depressed, and the delay becomes greater, the count value increases correspondingly, causing more stops to be actuated.

At the same time the crescendo stops are activated, a light indicator associated with each stop tab produces an output to indicate that that particular stop tab has been actuated. In addition, one or more crescendo indicator lights are activated to provide an indication of the relative position of the crescendo shoe. Consequently, the organist is provided with two types of visual feedback relating to the crescendo function.

Further features of the invention will become apparent from the detailed description which follows:

BRIEF DESCRIPTION OF THE DRAWING

FIG. 1A-FIG. 1B is a block diagram of the processing circuitry of the capture combination action of the present invention.

FIGS. 2A-FIG. 2E is a schematic diagram of a preferred implementation of the capture combination action of the present invention.

FIG. 3 is a schematic diagram illustrating the manner in which the individual drawings of FIG. 2A-FIG. 2E are to be assembled to complete the diagram.

FIG. 4 is a schematic diagram illustrating an alternate embodiment of the indicator and voice drive circuits of the present invention.

DETAILED DESCRIPTION

The capture combination action of the present invention is illustrated generally in the block diagram of FIG. 1A-1B and more particularly in the preferred implementation illustrated in FIG. 2A-2E. Signal processing in the present invention is under the control of a microprocessor unit (MPU) 100 operating from a control program stored in programmable read only memory (PROM) 200 and listed in detail in Appendix A and Appendix B. As used herein, programmable read only memory or read only memory means designates a physical device having permanently stored operating programs or data. All of the controls associated with the musical instrument such as stop tabs, thumb pistons, toe studs and the crescendo shoe, are continually and sequentially scanned by MPU 100. When one of these controls is activated, this condition is sensed by the MPU to provide suitable control outputs to the particular stop circuits required by the function of the control activated, and to the indicator circuits for providing a visual indication of the stops selected.

As noted above, the capture system permits the operator to easily program, or set, any combination of stops desired. This information relating to the combination of stops selected is stored in random-access memory (RAM) 500, under control of MPU 100. In addition, the stored information may be called as desired from RAM 500 to set the desired combination of stops. As used herein, random access memory or random access memory means designates a read/write memory.

In the preferred implementation illustrated in FIGS. 2A-2E, MPU 100 comprises an eight bit microprocessor such as the Mostek 3850 CPU. The manner in which the individual drawings of FIG. 2A-FIG. 2E are to be assembled to complete the diagram is illustrated in FIG. 3. In the arrangement illustrated, I/O port zero comprising I/O bus lines I/O$_{00-07}$ are used for transfer of latch information. The I/O port one lines I/O$_{10-17}$ are used as the switch-latch address output port lines. All of these functions will be described in more detail hereinafter.

A system clock 101, which may be conventional in design, operates at 1.95 MHz±50 KHz to supply clock signal $\overline{\text{XTLY}}$ to MPU 100.

MPU 100 communicates over data bus lines DB$_{0-7}$ with static memory interface 300, which may comprise a Mostek 3853 static memory interface module. This device provides interface logic for static read/write memories which do not need to be refreshed. Data bus lines DB$_{0-7}$ are also connected to the data output terminals O$_{1-8}$ of programmable read only memory (PROM) 200 which contains the operating program for MPU 100 as will be described in more detail hereinafter, and may be implemented as a 53255 ROM.

The control bus connected between MPU 100 and static memory interface 300 comprises a number of control lines ROMC$_{0-4}$, 0, $\overline{\text{WRITE}}$, and $\overline{\text{INT REQ}}$, which control transfer of information between MPU 100 and the static memory interface, as well as the various memory devices.

A crescendo circuit 400 is connected between the interrupt control bit output $\overline{\text{ICB}}$ from MPU 100 and the external interrupt line input $\overline{\text{EXT INT}}$ of static memory interface 300. This circuit operates in association with the crescendo shoe to control the execution of the crescendo program stored in PROM 200, and consequently the actuation of the stop combinations. As shown in FIG. 2E, the $\overline{\text{ICB}}$ signal from MPU 100 is coupled through resistor R1 to the base of transistor Q1. The emitter of transistor Q1 is connected to ground, while the collector is connected through the parallel combination of resistors R2 and R3 to the emitter of transistor Q2, as well as to the junction of capacitor C1 and resistor R4. The remaining terminal of capacitor C1 is connected to ground. The base of transistor Q2 is connected through the parallel combination of resistors R5 and R6 to supply voltage $+V_1$, and through resistor R7 to ground. The collector of transistor Q2 is connected through resistor R8 to the base of transistor Q3, and through resistor R9 to ground. The emitter of transistor Q3 is connected to ground, while the collector is connected through resistor R10 to supply voltage $+V_1$, and to the $\overline{\text{EXT INT}}$ input of static memory interface 300, to form the output of crescendo circuit 400.

The remaining end of resistor R4 is connected to one of the fixed terminals of variable resistor R11, which is associated with the crescendo shoe. The other fixed terminal of resistor R11 is connected to the base of transistor Q4. The wiper terminal of variable resistor R11 is connected to the collector of transistor Q5 and is mechanically linked by means not shown to the crescendo shoe. It will be understood that as the crescendo shoe is activated, the wiper of variable resistor R11 is caused to move, thereby varying the resistance applied between the base and collector of transistors Q4 and Q5, respectively. The emitter of transistor Q5 is connected through resistor R12 to supply voltage $+V_2$, while the base is connected to the emitter of transistor Q4, and through resistor R13 to the same supply voltage. The collector of transistor Q4 is connected through resistor R14 to supply voltage $+V_1$.

Initially, the $\overline{\text{ICB}}$ line from MPU 100 is at a high level, causing transistor Q1 to be turned off and discharging capacitor C1. However, when $\overline{\text{ICB}}$ goes low, transistor Q1 is cut off, permitting capacitor C1 to charge through constant current source Q4, Q5, crescendo shoe control resistor R11, and resistor R4. The position of the crescendo shoe determines the resistance of variable resistance R11 and the degree to which capacitor C1 charges during the time period defined by the $\overline{\text{ICB}}$ signal. The charge on the capacitor is applied to the emitter of transistor Q2 whose base voltage is determined by the resistor divider formed by resistors R5, R6 and R7.

With the crescendo shoe in the closed (fully up) position, potentiometer R11 is adjusted to set the voltage on capacitor C1 at a value which is more negative than the transistor Q2 base bias. In this mode of operation, transistor Q2 remains cut-off and no $\overline{\text{EXT INT}}$ command is applied to static memory interface 300. As the crescendo shoe is depressed from minimum to full, thereby varying resistor R11, the rate of charge on capacitor C1 increases accordingly. After a time period determined by the crescendo shoe position, the emitter-base junction of transistor Q2 becomes forward biased, permitting this transistor to saturate, thereby producing a signal which is inverted by transistor Q3 and applied to the $\overline{\text{EXT INT}}$ input of static memory interface 300. Consequently, the $\overline{\text{EXT INT}}$ signal will occur at some delayed time following the initial transition of each $\overline{\text{ICB}}$ pulse.

The $\overline{\text{EXT INT}}$ signal produced by crescendo circuit 400 causes an interrupt request $\overline{\text{INT REQ}}$ to be produced by the static memory interface 300, thereby causing microprocessor unit 100 to respond to the interrupt request by executing the crescendo program stored in PROM 200 as will be described in more detail hereinafter. This program establishes a count proportional to the crescendo shoe position. The magnitude of this count is compared with the values assigned to various ones of the stops and stored in a data table. Those stops having values associated with particular count values are actuated. With the crescendo shoe in the closed position, the time delay between the $\overline{ICB}$ and $\overline{EXT\ INT}$ signals is short causing the count value to be substantially zero, such that no stops are actuated. However, as the crescendo shoe is further activated, and the delay becomes greater, the count value increases correspondingly, causing more stops to be actuated.

It will be observed that this technique permits the interrupt request to MPU 100 to be delayed as a function of the crescendo shoe setting. It will be understood that other ways of accomplishing this delay, including digitally implemented delay lines and the like, may be substituted as desired. It will be further understood that the crescendo circuit 400 could operate to produce a digital sequence for causing the aforementioned count to be established as will become apparent from the description which follows.

In FIG. 2A the address bus formed by address lines $A_{0-8}$ connects static memory interface 300 with PROM 200, while address lines $A_{0-9}$ connect static memory interface 300 with RAM 500. For purposes of an exemplary showing, RAM 500 comprises an AMI 6508 static CMOS RAM with 1024×1 bit capacity. However, it will be understood that other types of mass memory media may be used as desired within the inventive concept of the present invention. Data is read into or out of RAM 500 under control of the chip enable $\overline{CE}$ line originating from memory address decoder 600 and the read/write $R/\overline{W}$ signal originating from static memory interface 300.

When the $\overline{CE}$ line is low, data is read into RAM 500 from line $DB_7$ of the data bus according to the address present on the address bus lines $A_0$-$A_9$, if the $R/\overline{W}$ line is in the low state. Likewise, when the $\overline{CE}$ line is in the low state, and the $R/\overline{W}$ line is in the high state, data will be read from the designated address location of RAM 500 through the $D_{OUT}$ terminal onto data line $DB_7$ of the data bus through parallel connected bilateral switches A and D. Switches A, B and D may be implemented by 4066 bilateral switches. These switches are turned on to provide a transmission path when the CPU READ line, which is also connected to the CHIP SELECT $C_S$ inputs of PROM 200, is at a high level.

As is well understood in the art, RAM 500 may include a continuously charged NiCad battery supply to insure that the stored information is preserved when the organ is disconnected from a power source, or under conditions of power failure.

Memory address decoder 600 decodes static memory interface 300 output bits $A_{10}$, $A_{11}$, $A_{12}$, and $A_{14}$ to provide the BCD address for RAM selection. Memory address decoder 600 may be implemented as a 74LS42 BCD to decimal decoder which produces a logical zero at the output corresponding to a four bit binary input from zero to nine, and a logical one at the other outputs. Since in the implementation illustrated, the selection address is part of the RAM output address, the $A_{14}$ bit is slightly delayed by means of a delay network, composed of resistors R15, R16 and R17, and capacitor C2. In other words, delay of the $A_{14}$ bit causes the $\overline{CE}$ signal to be delayed by an amount sufficient to permit the addressing inputs for RAM 500 to stabilize. Output $O_1$ from memory address decoder 600 is connected to the chip select inputs $C_{S1}$ and $C_{S2}$ of PROM 200 to enable this memory device when the proper address is decoded by the memory address decoder. In addition, output bit $O_9$ of memory address decoder 600 is connected through switch B to form the chip enable $\overline{CE}$ signal for enabling RAM 500.

The capture combination action circuit of the present invention also includes an initialization circuit, indicated generally at 700. This circuit prevents RAM 500 and MPU 100 from being energized until the system power supplies have stabilized at initial power turn-on. Initialization circuit 700 comprises resistors R18 and R19, and capacitor C3 serially connected between supply voltage $+V_1$ and ground. The base of transistor Q6 and the emitter of transistor Q7 are connected to the junction of resistors R18 and R19. The emitter of transistor Q6 is connected to ground, while the collector is connected to the cathode of diode D1 and the external reset $\overline{EXT\ RES}$ input of MPU 100. The collector of transistor Q7 is connected to the anode of diode D1, and to the junction of resistors R20 and R21, which are serially connected between supply voltage $+V_2$ and ground.

When the organ power is initially switched on the charging current for capacitor C3 develops a voltage drop across resistor R19. When this occurs, transistor Q6 saturates until capacitor C3 is charged, which requires approximately 0.8 second, thereby providing a negative going pulse to the $\overline{EXT\ RES}$ input line of MPU 100. This condition sets the execution of the microprocessor program to the memory address corresponding to the beginning of the operating program.

The junction of resistors R20 and R21 is connected to the control input of bilateral switch B which may be implemented by means of a 4066B quad bilateral switch. The input/output terminals of switch B are connected to output bit $O_9$ of memory address decoder 600 and the chip enable $\overline{CE}$ input of RAM 500, respectively. When transistor Q6 is saturated, the control voltage for bilateral switch B is held low by means of diode D1 and transistor Q6, maintaining this switch in the off condition, and preventing signals produced by memory address decoder 600 from reaching the $\overline{CE}$ input of RAM 500. In this manner, the RAM is prevented from being enabled until all supply sources have stabilized. Similarly, when the power supplies are turned off, the emitter of transistor Q7 is pulled negative by the discharging of capacitor C3, causing transistor Q7 to saturate. Diode D1 again pulls down the turn-on voltage of bilateral switch B to disable the $\overline{CE}$ input of RAM 500.

As shown in FIG. 2B, the port one output lines $I/O_{10-13}$ are connected to a four to sixteen line decoder 800 formed by BCD to decimal decoders 801 and 802, respectively. Output lines $I/O_{10-12}$ are connected to the A, B and C inputs, respectively, of decoders 801 and 802. Output line $I/O_{13}$ is connected directly to input D of decoder 802, and through inverter 803 to the D input of decoder 801. Four to sixteen line decoders 800, which may be implemented by components similar to that used for memory address decoder 600, operate to decode particular output states from MPU 100 to form the scan signals $S_{0-15}$ which sequentially interrogate the state of each stop tab and piston, and the latch enable signals $L_{0-15}$ which enable the bistable latches to provide enabling signals for the stop tab indicators and stop tab logic circuits. As will be explained in more detail hereinafter, switch scan signals $S_{0-5}$ are associated with the stop tabs, $\overline{S}_{11}$ and $\overline{S}_{12}$ with the operate and cancel pistons, and $\overline{S}_{15}$ with the sforzando, set and reversible controls.

Latch signals $L_{0-5}$ are associated with the stop tabs while $L_{15}$ is associated with the crescendo and sforzando indicators.

The switch scan signals $S_{0-7}$ are formed from the $O_{7-0}$ outputs from decoder 801, while switch scan signals $\overline{S}_{8-15}$ are formed from decoder 802 outputs $O_{7-0}$, respectively. Isolation is also provided in scan signal output lines $\overline{S}_{0-15}$ by means of resistors R22-R37.

The output lines $O_{7-0}$ from decoder 801 and output lines $O_{7-5}$ from decoder 802 are each connected to one of the inputs of NOR gates 804-814. The output line $O_0$ from decoder 802 is connected to one input of NOR gate 815. Together, NOR gates 804-815 form gate matrix 850. The remaining inputs to NOR gates 804-815 are connected to inverter 816. The input to inverter 816 is connected to output line $I/O_{17}$ of MPU 100. The outputs from NOR gates 804-815 form latch enable signals $L_{0-11}$, respectively.

In a preferred embodiment, the organ associated with the capture combination action of the present invention, includes a plurality of manuals such as GREAT, SWELL, PEDAL, etc., each of which encompasses a plurality of stop tabs or controls of the type described hereinabove. For purposes of illustration, the system illustrated in FIG. 2A-2E depicts only the GREAT manual 900 as in FIG. 2D; however, it will be understood that the inventive concept herein described may be extended to include other manuals of more or less complexity than those described. For example, a particular implementation of the present invention may be found in the Model 635 Series Organ, manufactured by Baldwin Piano & Organ Company.

The GREAT manual includes a number of stop tabs or controls designated PRINCIPAL 8', WALDFLOTE 8', DULCIANA 8', and UNDA MARIS 8', of the type described in copending application entitled Stop Tab for Capture Combination Action Systems Used in Electronic Organs, filed Feb. 14, 1980 and bearing Ser. No. 121,539, now U.S. Pat. No. 4,276,803, and assigned to the same assignee. Each of these mechanisms as in FIG. 1B, comprises a stop tab 1 which may project outwardly through an elongated opening in a tab panel adapted to be mounted on the organ console, and an indicator light 4 mounted on the tab board immediately adjacent each of the stop tabs 1. Each stop tab includes a switching member having a movable or spring contact 12, a fixed contact 10 comprising the "ON" position of the switch, and a fixed contact 11 comprising the "OFF" position of the switch. The stop tab is of the "return-to-center" type, so that it normally occupies a neutral or rest position in which the spring contact 12 is in contact with neither of the fixed contacts 10 or 11. When the stop tab is depressed by the organist, the stop pivots, moving spring contact 12 upwardly into electrical contact with stationary contact 10 to complete an electrical path for providing an indication that the stop tab has been turned on. When the stop tab is released, it immediately returns to its neutral position.

When it is desired to cancel the stop, the stop tab 1 is lifted upwardly such that the movable contact 12 is brought into electrical contact with the underlying stationary contact 11, thereby resulting in an electrical path for providing an indication that the stop tab has been turned off. Again, when the stop tab is released, it will return to the center or neutral position. It will be understood that the stop tabs of the present invention lack any type of mechanical movers such as electromagnetic solenoids or the like for shifting the position of the stop tab between the on and off positions under the influence of an operate or cancel piston. Rather, the stops are set or released electronically under the control of the pistons or toe studs, with a visual indication being provided by an indicator light 4 which may represent an incandescent lamp or a LED. For purposes of illustration, the stop tabs associated with PRINCIPAL 8', WALDFLOTE 8', DULCIANA 8', and UNDA MARIS 8' are designated 1a-1d, respectively, while the indicators associated with each of these stop tabs are designated 4a-4d, respectively.

As described hereinabove, the driving signals for indicator lights 4 and the tab logic output signals, for example $L_3D_4$, both originate from a single bistable latch output as determined by the data signals $D_{0-7}$ and latch enable signals $L_{0-15}$. However, in some musical instruments it may be desirable to provide for stop tab light indications independent of the signals activating the stop tabs themselves. In other words, activation of the sforzando or crescendo functions would affect the stops, but not necessarily the indicator lights. This is similar to the operation of conventional mechanical combination actions where operation of the sforzando or crescendo functions does not physically move the tabs. Consequently, a visual indication would be provided to the performer of only those stop tabs which he has turned on, whereas the actual stops activated include these as well as the ones added by the combination action.

An alternative embodiment to include this function with the combination action of the present invention is illustrated in FIG. 4, and uses separate latching circuits for driving the stops and indicator lights. In this arrangement, a first latch circuit 981a similar to latch circuit 981 of FIG. 2A-2E, utilizes data lines $D_{4-7}$, latch enable signal $L_3$, and switch scan signal $\overline{S}_3$ to provide the driving signals for indicator lamps 4a-4d. The operation of this portion of the circuit is essentially the same as that described hereinabove with respect to GREAT manual control circuit 900, except that no outputs are provided to the tab logic.

The tab logic drive signals $L_3D_{4-7}$ are provided by outputs from latch circuits 981b in response to data input signals $D_{4-7}$ and latch enable signal L'3. In the arrangement shown, latch enable signal L'3 is produced through NOR gate 811a by the combination of switch scan signal $\overline{S}_3$ and the inversion of switch-latch address output port signal $I/O_{16}$ from MPU 100, in a manner similar to that described hereinabove in connection with the production of latch enable signal $L_3$. The other latch circuits (not shown) used to produce the tab logic drive signals will operate similarly with a separate matrix of NOR gates under control of address output port line $I/O_{16}$. As will be described in more detail hereinafter, this embodiment utilizes the output light latch subroutine LLL to control the outputs from latch 981a to illuminate the indicator lights 4, and the output voice latch subroutine OVL to produce the tab logic drive signals from latch circuits 981b. In addition, to the stop tabs, the organ may include a plurality of pistons or toe studs, designated generally at 920 as shown in FIG. 1B and in greater detail in FIG. 2D. Each piston or toe stud comprises a movable switch member shown generally at 921, which when activated provides a conductive path between a pair of fixed spaced contacts 922 and 923, respectively. As illustrated in FIG. 2A–2E, a plurality of pistons or toe studs may be provided with the organ. For example, the operate pistons designated GENERAL 1–6 control the stops associated with all divisions (manual and pedal). As is well understood in the art, the organ may be provided with cancel switches, a sforzando control, etc. Furthermore, the present invention contemplates the use of a PERSONAL COMBINATION SWITCH which permits the performer to program and recall a designated combination of stops, as will be described in more detail hereinafter.

Turning to the PRINCIPAL 8' stop tab 1a and associated indicator light 4a of the GREAT manual 900 illustrated in FIG. 2A–2E, it will be seen that the movable or spring contact of the stop tab is connected to the anode of diode D2. Similarly, the movable contact associated with the WALDFLOTE 8' stop tab is connected to the anode of diode D3, and so forth. The cathodes of all diodes associated with one of the switch scan signals $\bar{S}_{0-15}$, are connected together. In the case of the diodes associated with a portion of the GREAT manual 900, illustrated in FIG. 2D, the cathodes of diodes D2–D5 are connected to switch scan signal $\bar{S}_3$.

The stationary contact 10 associated with the ON position of the tab members form the "ON" tab switch information signals $A_{0-7}$. In the case of GREAT manual 900, the particular output signals resulting from the ON position of the tab members are designated $A_4$–$A_7$.

Similarly, the stationary contacts 11 associated with the OFF position of the stop tabs form the tab switch "OFF" information output signals $B_{0-7}$. In the case of GREAT manual 900, these signals are designated $B_4$–$B_7$.

As described above, indicator lights 4a–4d provide a visual indication that the associated stop is activated. For example, indicator light 4a, which may be an incandescent lamp or LED, has one terminal grounded, and the other terminal connected to the output of driver amplifier A, illustrated in detail at 910. Each driver amplifier A comprises a transistor Q8 having the emitter connected to supply voltage $+V_1$, the base of the transistor connected to supply voltage $+V_1$ through resistor R38, and the collector connected to the base of the transistor through capacitor C4, which also forms the output of the amplifier. The input to the amplifier is connected to the base of transistor Q8 through resistor R39. Each of the other driver amplifiers A is of similar construction, and need not be described in detail.

The outputs of driver amplifiers A also form the tab logic outputs $L_XD_Y$ which control the particular voices selected for the organ. For example, when a signal is present on the $L_3D_4$ tab logic output from the PRINCIPAL 8' stop of the GREAT manual, the appropriate voicing will be selected by the tab logic circuitry (not shown) to cause the musical tones to have the appropriate voicing characteristics corresponding to this stop. In the arrangement illustrated, the output signals from GREAT manual 900 are designated $L_3D_4$–$L_3D_7$.

A somewhat similar arrangement is utilized with the switches comprising piston and toe stud switches 920. For example, with respect to the GENERAL 1–6 operate pistons one terminal of each piston switch is connected to switch scan signal $\bar{S}_{11}$. The other contact of each piston switch is connected to one of the switch ON lines $A_1$–$A_7$. In the case of GENERAL pistons 1–4, coupling to lines $A_4$–$A_7$ is accomplished by means of isolation diodes D6–D9.

In a similar manner, piston switches may be provided for the SWELL, GREAT and PEDAL divisions. Furthermore, PEDAL toe stud switches may be provided for the pedals as required. It is also contemplated that CANCEL switches may be incorporated to cancel selected stops of particular manuals. For example, the SWELL cancel switch is connected between the $\bar{S}_{12}$ switch scan signal and switch ON line $A_7$ in association with isolation diode D15.

A PERSONAL COMBINATION SWITCH may also be provided for storing and recalling a particular selected set of stop combinations. As illustrated, the PERSONAL COMBINATION SWITCH, which may be of the keylock variety, is connected between switch scan signal $\bar{S}_{13}$ and OFF output line $B_6$, in association with diode D29. It will be understood that other combinations or arrangements of pistons toe studs, cancel switches and one or more personal combination switches may be provided to meet the needs of individual organs or performers.

The tab and piston switch information signals $A_{0-7}$ and $B_{0-7}$ are applied to switch selector multiplexer 950 which operates to select the proper tab and piston switch information signal for the appropriate stop latch circuit. Each selector multiplexer 950 is implemented by a pair of 4019 quad AND/OR SELECT gates 951 and 952. The tab and piston switch information signals $A_{0-7}$ and $B_{0-7}$ are applied to the select gates by means of pull-up resistors R40–R55 and series resistances R56–R71. Tab and piston switch information signals $A_0$–$A_3$ are applied to input terminals $A_1$–$A_4$ of select gate 951, while switch information signals $B_0$–$B_3$ are applied to input terminals $B_1$–$B_4$ respectively, of select gate 951. Similarly, switch information signals $A_4$–$A_7$ and $B_4$–$B_7$ are applied to input terminals $A_1$–$A_4$ and $B_1$–$B_4$, respectively, of select gate 952, Control bit inputs $K_A$ and $K_B$ are connected to switch-latch address output port terminals I/O$_{13}$ and I/O$_{14}$, respectively, of MPU 100.

In a typical operating sequence for select gate 951, for example, signals appearing on switch information lines $A_0$–$A_7$ will appear on the appropriate one of output terminals $D_1$–$D_4$ of select gate 951 or 952 when the $K_A$ (switch-latch address output port I/O$_{13}$) control input terminal is brought to a high level. Similarly, signals appearing on switch information lines $B_{0-7}$ will appear on the appropriate output terminal $D_1$–$D_4$ of select gate 951 or 952 when the control terminal $K_B$ (switch-latch address output port I/O$_{14}$) is brought to a high level.

The outputs from switch selector multiplexer 950 comprising signal lines $D_1$–$D_4$ are connected to the inputs of buffer gate 960 comprising gates 961–968. The output from each gate is connected to the input of an inverter 970 comprising individual inverter stages 971–987. The individual outputs from inverters 971–978 form the latch data signals $D_0$–$D_7$ which control bistable latches 980, which in turn activate the selected stop indicator lamps 4 and the appropriate tab logic circuits to select the desired voicing. For example, in the case of the GREAT manual illustrated in FIG. 2A–2E, data signals $D_4$–$D_7$ are connected, respectively, to inputs $D_D$–$D_A$ of bistable latch 981. It will be understood that similar latches associated with each manual will be responsive to particular input data signal combinations to select the appropriate tab indicator lamps 4 and tab logic circuits The outputs $Q_A$–$Q_D$ are applied to the input of the appropriate A amplifier 910-913. In addition, the enable E input of latch 981 is connected to latch enable signal line $L_4$. It will be further understood that bistable latches 980 associated with other organ manuals will utilize different latch enable signals $L_0-L_5$. In the configuration illustrated, bistable latches 980 may be implemented by means of 74LS75 quad bistable latches.

The specific signals associated with each stop tab, and the other organ controls, are illustrated below in Table 1.

TABLE 1

| MANUAL | STOP TAB OR CONTROL | | $\overline{S}_x$ | $L_x$ | $D_x$ | $L_xD_y$ | $A_x$ | $B_x$ |
|---|---|---|---|---|---|---|---|---|
| PEDAL | PEDAL CANCEL | | $\overline{S}_{11}$ | | | | | $B_7$ |
| | PRINCIPAL | 16' | $\overline{S}_0$ | $L_0$ | $D_0$ | $L_0D_0$ | $A_0$ | $B_0$ |
| | SUB BASS | 16' | $\overline{S}_0$ | $L_0$ | $D_1$ | $L_0D_1$ | $A_1$ | $B_1$ |
| | LIEBLICH GEDECKT | 16' | $\overline{S}_0$ | $L_0$ | $D_2$ | $L_0D_2$ | $A_2$ | $B_2$ |
| | OCTAVE | 8' | $\overline{S}_0$ | $L_0$ | $D_3$ | $L_0D_3$ | $A_3$ | $B_3$ |
| | GEDECKT | 8' | $\overline{S}_0$ | $L_0$ | $D_4$ | $L_0D_4$ | $A_4$ | $B_4$ |
| | FUGARA | 4' | $\overline{S}_0$ | $L_0$ | $D_5$ | $L_0D_5$ | $A_5$ | $B_5$ |
| | BLOCK FLOTE | 2' | $\overline{S}_0$ | $L_0$ | $D_6$ | $L_0D_6$ | $A_6$ | $B_6$ |
| | BOMBARD | 16' | $\overline{S}_0$ | $L_0$ | $D_7$ | $L_0D_7$ | $A_7$ | $B_7$ |
| | GREAT TO PEDAL | 8' | $\overline{S}_1$ | $L_1$ | $D_2$ | $L_1D_2$ | $A_2$ | $B_2$ |
| | GREAT TO PEDAL | 4' | $\overline{S}_1$ | $L_1$ | $D_3$ | $L_1D_3$ | $A_3$ | $B_3$ |
| | SWELL TO PEDAL | 8' | $\overline{S}_1$ | $L_1$ | $D_0$ | $L_1D_0$ | $A_0$ | $B_0$ |
| | SWELL TO PEDAL | 4' | $\overline{S}_1$ | $L_1$ | $D_1$ | $L_1D_1$ | $A_1$ | $B_1$ |
| SWELL | SWELL CANCEL | | $\overline{S}_{12}$ | | | | $A_7$ | |
| | LIEBLICH GEDECKT | 16' | $\overline{S}_1$ | $L_1$ | $D_4$ | $L_1D_4$ | $A_4$ | $B_4$ |
| | GEDECKT | 8' | $\overline{S}_1$ | $L_1$ | $D_5$ | $L_1D_5$ | $A_5$ | $B_5$ |
| | VIOLE | 8' | $\overline{S}_1$ | $L_1$ | $D_6$ | $L_1D_6$ | $A_6$ | $B_6$ |
| | VIOLE CELESTE | 8' | $\overline{S}_1$ | $L_1$ | $D_7$ | $L_1D_7$ | $A_7$ | $B_7$ |
| | GEIGEN | 4' | $\overline{S}_2$ | $L_2$ | $D_1$ | $L_2D_1$ | $A_1$ | $B_1$ |
| | COPULA | 4' | $\overline{S}_2$ | $L_2$ | $D_0$ | $L_2D_0$ | $A_0$ | $B_0$ |
| | NAZARD | 2⅔' | $\overline{S}_2$ | $L_2$ | $D_2$ | $L_2D_2$ | $A_2$ | $B_2$ |
| | FLAUTINO | 2' | $\overline{S}_2$ | $L_2$ | $D_3$ | $L_2D_3$ | $A_3$ | $B_3$ |
| | TIERCE | 1-3/5' | $\overline{S}_2$ | $L_2$ | $D_4$ | $L_2D_4$ | $A_4$ | $B_4$ |
| | SPITZ PFEIFE | 1' | $\overline{S}_2$ | $L_2$ | $D_5$ | $L_2D_5$ | $A_5$ | $B_5$ |
| | TRUMPET | 8' | $\overline{S}_2$ | $L_2$ | $D_6$ | $L_2D_6$ | $A_6$ | $B_6$ |
| | CLARION | 4' | $\overline{S}_2$ | $L_2$ | $D_7$ | $L_2D_7$ | $A_7$ | $B_7$ |
| | TREMULANT | | $\overline{S}_3$ | $L_3$ | $D_0$ | $L_3D_0$ | $A_0$ | $B_0$ |
| | SWELL TO SWELL | 16' | $\overline{S}_3$ | $L_3$ | $D_1$ | $L_3D_1$ | $A_1$ | $B_1$ |
| | UNISON OFF | | $\overline{S}_3$ | $L_3$ | $D_2$ | $L_3D_2$ | $A_2$ | $B_2$ |
| | (LIGHT) | | $\overline{S}_3$ | $L_3$ | $D_2$ | $\overline{L_2D_2}$ | | |
| | SWELL TO SWELL | 4' | $\overline{S}_3$ | $L_3$ | $D_3$ | $L_3D_3$ | $A_3$ | $B_3$ |
| GREAT | GREAT CANCEL | | $\overline{S}_{12}$ | | | | | $B_7$ |
| | PRINCIPAL | 8' | $\overline{S}_{12}$ | $L_3$ | $D_4$ | $L_3D_4$ | $A_4$ | $B_4$ |
| | WALDFLOTE | 8' | $\overline{S}_3$ | $L_3$ | $D_5$ | $L_3D_5$ | $A_5$ | $B_5$ |
| | DULCIANA | 8' | $\overline{S}_3$ | $L_3$ | $D_6$ | $L_3D_6$ | $A_6$ | $B_6$ |
| | UNDA MARIS | 8' | $\overline{S}_3$ | $L_3$ | $D_7$ | $L_3D_7$ | $A_7$ | $B_7$ |
| | OCTAVE | 4' | $\overline{S}_4$ | $L_4$ | $D_0$ | $L_4D_0$ | $A_0$ | $B_0$ |
| | FLUTE OUVERTE | 4' | $\overline{S}_4$ | $L_4$ | $D_1$ | $L_4D_1$ | $A_1$ | $B_1$ |
| | FLUTE | 2⅔' | $\overline{S}_4$ | $L_4$ | $D_4$ | $L_4D_4$ | $A_4$ | $B_4$ |
| | SUPER OCTAVE | 2' | $\overline{S}_4$ | $L_4$ | $D_2$ | $L_4D_2$ | $A_2$ | $B_2$ |
| | MIXTURE | IV | $\overline{S}_4$ | $L_4$ | $D_3$ | $L_4D_3$ | $A_3$ | $B_3$ |
| | CHIMES | | $\overline{S}_4$ | $L_4$ | $D_6$ | $L_4D_6$ | $A_6$ | $B_6$ |
| | HARP | | $\overline{S}_4$ | $L_4$ | $D_5$ | $L_4D_5$ | $A_5$ | $B_5$ |
| | CELESTA | | $\overline{S}_4$ | $L_4$ | $D_7$ | $L_4D_7$ | $A_7$ | $B_7$ |
| | TREMULANT | | $\overline{S}_5$ | $L_5$ | $D_0$ | $L_5D_0$ | $A_0$ | $B_0$ |
| | GREAT TO GREAT | 16' | $\overline{S}_5$ | $L_5$ | $D_1$ | $L_5D_1$ | $A_1$ | $B_1$ |
| | UNISON OFF | | $\overline{S}_5$ | $L_5$ | $D_2$ | $L_5D_2$ | $A_2$ | $B_2$ |
| | (LIGHT) | | $\overline{S}_5$ | $L_5$ | $D_2$ | $\overline{L_5D_2}$ | | |
| | GREAT TO GREAT | 4' | $\overline{S}_5$ | $L_5$ | $D_3$ | $L_5D_3$ | $A_3$ | $B_3$ |
| | SWEEL TO GREAT | 16' | $\overline{S}_5$ | $L_5$ | $D_4$ | $L_5D_4$ | $A_4$ | $B_4$ |
| | SWELL TO GREAT | 8' | $\overline{S}_5$ | $L_5$ | $D_5$ | $L_5D_5$ | $A_5$ | $B_5$ |
| | SWELL TO GREAT | 4' | $\overline{S}_5$ | $L_5$ | $D_6$ | $L_5D_6$ | $A_6$ | $B_6$ |
| | CELESTIAL VIBRATO | | $\overline{S}_5$ | $L_5$ | $D_7$ | $L_5D_7$ | $A_7$ | $B_7$ |
| GENERAL & CANCEL (G.C.)PISTONS | 1 | | $\overline{S}_{11}$ | | | | $A_6$ | |
| | 2 | | $\overline{S}_{11}$ | | | | $A_5$ | |
| | 3 | | $\overline{S}_{11}$ | | | | $A_4$ | |
| | 4 | | $\overline{S}_{11}$ | | | | $A_3$ | |
| | 5 | | $\overline{S}_{11}$ | | | | $A_2$ | |
| | 6 | | $\overline{S}_{11}$ | | | | $A_1$ | |
| | G.C. | | $\overline{S}_{11}$ | | | | $A_7$ | |
| SWELL PISTONS | 1 | | $\overline{S}_{12}$ | | | | $A_6$ | |
| | 2 | | $\overline{S}_{12}$ | | | | $A_5$ | |
| | 3 | | $\overline{S}_{12}$ | | | | $A_4$ | |
| | 4 | | $\overline{S}_{12}$ | | | | $A_3$ | |
| SFORZANDO PISTON & TOE STUD | SFZ | | $\overline{S}_{15}$ | | | | $A_7$ | |
| | (LIGHT) | | $\overline{S}_{15}$ | $L_{15}$ | $D_7$ | $L_{15}D_7$ | | |
| SET PISTON | SET | | $\overline{S}_{15}$ | | | | | $B_7$ |
| PEDAL PISTON & TOE STUDS | 1 | | $\overline{S}_{11}$ | | | | | $B_6$ |
| | 2 | | $\overline{S}_{11}$ | | | | | $B_5$ |

TABLE 1-continued

| MANUAL | STOP TAB OR CONTROL | $S_x$ | $L_x$ | $D_x$ | $L_xD_y$ | $A_x$ | $B_x$ |
|---|---|---|---|---|---|---|---|
| | 3 | $S_{11}$ | | | | | $B_4$ |
| | 4 | $S_{11}$ | | | | | $B_3$ |
| GREAT PISTONS | 1 | $S_{12}$ | | | | | $B_6$ |
| | 2 | $S_{12}$ | | | | | $B_5$ |
| | 3 | $S_{12}$ | | | | | $B_4$ |
| | 4 | $S_{12}$ | | | | | $B_3$ |
| GREAT TO PEDAL TOE STUD | GREAT TO PEDAL | $S_{15}$ | | | | $A_6$ | |
| CRESCENDO INDICATORS | 1 | | $L_{15}$ | $D_0$ | $L_{15}D_0$ | | |
| | 2 | | $L_{15}$ | $D_1$ | $L_{15}D_1$ | | |
| | 3 | | $L_{15}$ | $D_2$ | $L_{15}D_2$ | | |
| | 4 | | $L_{15}$ | $D_3$ | $L_{15}D_3$ | | |
| | 5 | | $L_{15}$ | $D_4$ | $L_{15}D_4$ | | |

For example, the PRINCIPAL 8' stop tab of the GREAT manual is scanned by switch scan signal $S_x = S_3$, while latch 981 is actuated under control of latch enable signal $L_x = L_3$ and data signal $D_x = D_4$. The ON position of stop tab 1a results in switch information signal $A_x = A_4$, while the OFF position results in $B_x = B_4$. The resulting output for the tab logic circuit is $L_xD_y = L_3D_4$.

The bidirectional latch information signals $I/O_{0-7}$ from MPU 100 are connected, respectively to the outputs of buffer gates 961-968, to complete the interconnections with the microprocessor unit.

The capture combination action circuit of the present invention also includes means for providing a visual indication of the degree to which the crescendo shoe is activated in the form of crescendo indicators 1000. In the arrangement illustrated in FIG. 2A-2E, data signals $D_{0-7}$ are applied to bistable latches 1010 formed by latch circuits 1011 and 1012. More particularly, data lines $D_{0-3}$ are applied to the $D_D-D_A$ inputs, respectively of latch circuit 1011, while data lines $D_{4-7}$ are applied to data input terminals $D_D-D_A$, respectively, of latch circuit 1012. The enable E input terminals of both latch circuits are connected to latch enable line $L_{15}$. The outputs $Q_D-Q_A$ from latch circuit 1011 are connected through driver amplifiers 1013-1016 to the anode of crescendo LED's 1-4, respectively. The cathodes of these light emitting diodes are connected to ground. A typical D driver amplifier is illustrated for amplifier 1016 and comprises a transistor Q9 having its emitter connected to supply voltage $+V_1$. The base of this transistor is connected to the emitter through resistor R72 and to the appropriate output of the latch circuit through resistor R73. The collector is connected to the base through capacitor C5, and through resistor R74 to form the output of amplifier D.

In a similar manner, output $Q_D$ is applied through D driver amplifier 1017 to the anode of crescendo LED 5. Likewise, output $Q_A$ of latch circuit 102 is supplied through D driver amplifier 1018 to the anode of the sforzando LED. All of the cathodes of these light emitting diodes are connected to ground.

A typical operating sequence for the crescendo combinations in relation to the crescendo shoe position is illustrated below in Table 2.

TABLE 2

| CRESCENDO SHOE POSITION | | |
|---|---|---|
| CRESCENDO INDICATORS | SELECTED STOPS | |
| FULLY UP (CLOSED) | NONE | |
| # ① ON | SWELL TO GREAT | 8' (GREAT) |
| | SWELL TO PEDAL | 8' (PEDAL) |
| | LIEBLICH GEDECKT | 16' (PEDAL) |
| # ② ON | DULCIANA | 8' (GREAT) |
| | VIOLE | 8' (SWELL) |
| | GEDECKT | 8' (SWELL) |
| | GEDECKT | 8' (PEDAL) |
| | COPULA | 4' (SWELL) |
| # ③ ON | WALDFLOTE | 8' (GREAT) |
| | SUB BASS | 16' (PEDAL) |
| | FLUTE OUVERTE | 4' (GREAT) |
| | OCTAVE | 8' (PEDAL) |
| | GEIGEN | 4' (SWELL) |
| | PRINCIPAL | 8' (GREAT) |
| | FLAUTINO | 2' (SWELL) |
| | OCTAVE | 4' (GREAT) |
| | PRINCIPAL | 16' (PEDAL) |
| # ④ ON | SUPER OCTAVE | 2' (GREAT) |
| | FUGARA | 4' (PEDAL) |
| | BLOCKFLOTE | 2' (PEDAL) |
| | SPITZ PFEIFE | 1' (SWELL) |
| # ⑤ ON | MIXTURE | IV (GREAT) |
| FULLY DOWN (OPEN) | NO CHANGE | |

For example, when the crescendo shoe is in the fully up or closed position, none of the stops is selected. However, as the shoe is depressed, crescendo indicator 1 is illuminated, and the appropriate stops selected.

Additional crescendo indicators are illuminated and stop groups selected as the particular ranges are traversed. When the shoe is in the fully down or open position, the full complement of crescendo stops is selected. As implemented, the crescendo stops are selected in 16 sequential steps. However, it will be understood that the stops could be selected individually at sequential positions of the crescendo shoe. In any event, the crescendo indicators in combination with the stop tab indicators provide visual feedback to the organist of the specific stops which have been selected for a particular crescendo shoe position.

In the specific implementation illustrated using the 3850 microprocessor and associated instruction set, RAM 500 is designated as a memory location having an address beginning at H'400, and is designated permanent memory assigned as label field PMS.

In addition to the program listing which will be described in more detail hereinafter, PROM 200 also contains a number of data tables as shown in Appendix B.

The ZERO table contains data for cancelling all stops when power is first applied to the organ at initial turn on. Although the program instructions and data tables make provision for an organ having 88 stops, the present invention is described and illustrated in connection with an organ having only 48 stops.

The LT table contains data for controlling the illumination of the crescendo and sforzando indicator lights. It will be observed that this table makes provision for seven crescendo lights, although in the specific embodiment illustrated only five crescendo lights are utilized. For example, in the table, each crescendo light is assigned a hexadecimal number value, such as H'F corresponding to crescendo light 1. When the sum of this value and a number corresponding to the position of the crescendo shoe exceeds 15 that particular crescendo light will be illuminated, as will be explained in more detail hereinafter. Consequently, crescendo light 1 is illuminated first, followed by crescendo light 2 etc. The data for crescendo lights 6 and 7 will be ignored. The single sforzando light will be illuminated when the sforzando control is activated. The SCFT table contains data defining when the various stops should be activated under control of the crescendo shoe and sforzando pistons or toe studs. Each stop is assigned a hexadecimal number value such as H'4 for stop 0. When the sum of these values and a number corresponding to the position of the crescendo shoe exceeds 15, that particular stop will be selected. For example, when the value of the number associated with the position of the crescendo shoe is H'6, stops 2, 8, 13, 14, 30 and 45 will be selected. It will be observed that there are four bytes defining eight stops, with the fifth entry being sforzando data for controlling stops 0-7, for example. Again it will be observed that only the first 48 stops in the table are utilized, with null entries occurring for the remaining possible 40 stop combinations.

Table DT contains data relating to the number of pistons and stops in each division. For example, the first entry in the table indicates that there are six pistons in the GENERAL division as illustrated in FIG. 2A-2E. The second entry defines the starting stop number as stop zero, while the third entry indicates that there are 48 stops in the GENERAL division. Likewise, the fourth entry defines four pistons in the PEDAL division starting at stop number zero, and including a total of twelve stops. Similarly, in the SWELL division, there are four pistons, starting at stop number 12 and including 16 stops. Finally, in the GREAT division, there are also four pistons, beginning at stop number 28, and including 20 stops. The remainder of the table is empty to permit entry of additional data for organs having more complex manuals.

The SRT table contains data for defining a total of seven reversibles. In the present implementation, however, only one reversible (GREAT TO PEDAL) is utilized, and is defined as stop number 10 for reversible number 6.

The operating program stored in PROM 200 may be described in terms of a number of individual subroutines and data tables occupying contiguous locations in memory as listed in Appendix A and Appendix B, respectively. When power is initially applied to the organ, the circuitry undergoes the initialization sequence described above under control of initializer circuit 700 to prevent activation of MPU 100 or RAM 500. In addition, the registers of MPU 100 are initialized to set the select count controlling the scan sequence of the stop tabs and pistons to an initial value of 15. An additional CANCEL routine is executed to insure that all stops, pistons, toe studs and indicator lamps are cancelled when power is initially applied to the organ.

The initialization (STRT) subroutine insures that the system is energized at initial power-up with all stops and indicator lights turned off. In effect, this routine causes the same action as a GENERAL CANCEL operation, thereby cancelling all stops and extinguishing all indicator lights. During execution, the program looks at the table ZERO (see Appendix B), and determines that all the stops should be initialized to zero.

Following a return from the ISN subroutine, the INC or increment select program is executed. Initially, the select is set such that S=15. The value of S is then incremented to zero, to initialize scanning all controls of the organ responding to the $\bar{S}_0$ switch scan signal. This switch scan signal is produced by $\overline{I/O}_{10-14}$ switch-latch address output port lines decoded by switch and latch decoder circuit 801. With the $\bar{S}_0$ select line, the MPU 100 will check the condition (either on or off) of the associated group of stop tab controls. The $\bar{S}_0$ bus, via the diodes associated with the stop tabs, and the switch contacts, sets either of the appropriate A or B buses to the low state.

In the embodiment illustrated, register 2 of the scratch pad memory of microprocessor MPU 100 is used to temporarily store A switch information, while register 3 of the scratch pad memory is used to temporarily store the B switch information. At this point, all enable lines are disabled.

As illustrated in Table 1, the switch scan signals $\bar{S}_{0-5}$ relate to the 48 stop tabs. Switch scan signals $\bar{S}_{11}$ and $\bar{S}_{12}$ relate to the 22 divisional cancels and divisional pistons. Switch scan signal $\bar{S}_{15}$ relates to the sforzando piston and toe stud, the set piston, the reversible (GREAT TO PEDAL toe stud) and the personal combination. In the processing scheme embodied in the illustrated implementation of the present invention, each of these groups of scan signals is treated somewhat differently. For example, in the INC subroutine when the select S value is greater than 10 and less than 15, indicating that the select is associated with switch scan signals $\bar{S}_{11}$ or $\bar{S}_{12}$, the routine branches to the cancel and divisional piston routine PS3, beginning with piston switch initialization subroutine PR1, through the intermediate branch point BPR1. Similarly, if S=15, indicating that the switch scan signal is $\bar{S}_{15}$, relating to the sforzando, set and reversible functions, subroutine INC branches to the crescendo pedal routine CSNP. If the value of the select bit S fits neither of these criteria, indicating that the processing is scanning the stop tab conditions, the subroutine continues sequentially.

In the embodiment described, each select S is associated with a pair of scratch pad registers 2 and 3 located within MPU 100. Scratch pad register 2 is used to store information relating to the condition of the A (ON) state of stop tabs 1, while scratch pad register 3 is associated with the condition of the B (OFF) switches associated with stop tabs 1. A set of eleven pairs of scratch pad registers in MPU 100 is assigned to monitor the condition of the switches associated with stop tabs 1. Each register consists of eight bits, with the same bit position in each pair of registers corresponding to the state of particular A and B switches. For example, if a particular A or B switch is detected in the closed state, the appropriate bits in the corresponding pair of scratch pad registers will be set to the 11 state, as follows:

| Scan D | 0001 | 0000 |
|---|---|---|
|  | 0001 | 0000 |

It will be understood that a detected closure of either the A or B switch associated with a particular stop tab will cause the corresponding bits in both registers to be set. During each successive scan, the binary number represented in the pair of scratch pad registers as 11 will be decremented if neither the A nor B switches are closed. For example, if no further closures are detected, the scratch pad register contents illustrated above will appear successively as follows:

| Scan 1 | 0001 | 0000 |
|---|---|---|
|  | 0000 | 0000 |
| Scan 2 | 0000 | 0000 |
|  | 0001 | 0000 |
| Scan 3 | 0000 | 0000 |
|  | 0000 | 0000 |

In other words, during successive scans, if both of the A and B switches associated with a particular stop tab are open, the bits in the pair of scratch pad registers associated with that stop tab will decrement successively from 11 to 10, 01 and finally to the 00 state. If during any of these successive scans, however, either of the stop tab switches are again detected closed, the appropriate bits will be set to 11, and the decrementing process will repeat. The condition of the A switches stored in register 2 and the condition of the B switches stored in register 3 cannot be changed by a new switch closure until the appropriate scratch pad register count has decremented to 00. This arrangement serves to insure that a momentary switch closure, that might be caused by switch bounce, for example, is not misinterpreted as a false switch state. In other words, following an initial momentary switch closure, the switch contact must remain open for a minimum of three scans before a new closure will be recognized. Since each scan requires approximately 25–50 milliseconds, depending on the particular setting of the crescendo shoe and the frequency of system clock 101, false closures caused by switch bounce are eliminated. The switch bounce preventing means is not required for controls such as the divisional pistons associated with switch scan signals $\bar{S}_{11}$ and $\bar{S}_{12}$; consequently, the branch instruction for the divisional piston routine is located before the switch bounce eliminating instructions. The procedure is also somewhat different when s=15, where the B switch condition is ignored, since the switches associated with the $\bar{S}_{15}$ scan signals include only one pair of contacts. As a result, the switch bounce eliminating routine relays only to the information contained in scratch pad register 2 corresponding to the A switches.

The update scratch pad routine (UPDT) modifies the contents of the upper or permanent scratch pad memory locations to reflect the current status whether a particular stop is on or off. In the particular embodiment shown, the contents of register 2 corresponding on the "ON" information for a particular stop is combined with the contents of the particular upper scratch pad memory in an AND operation. Since the contents (toggle bits) of register 2 will be low if that particular switch is on, the resulting AND operation will result in all zeros if the switch is on. A similar operation occurs for the information contained in register 3 corresponding to the stop "OFF" information. Consequently, it will be observed that this sequence of instructions results in stop tab operation where the stop tab must be pressed in one direction to turn the stop on, and in the opposite direction to cancel the stop.

However, it is contemplated to be within the present invention to provide for stop tab operation where the stop tab is pushed in a first direction, for example, downwardly, to set the stop, and pressed in the same direction to cancel the stop, resulting in a "push-push" on-off operation. This feature may be implemented in the UPDT routine by replacing the AND instruction NS S with an exclusive OR instruction XS S, and replacing the immediately following complement instruction COM, with a no operation instruction NOP.

In either implementation, the contents of the upper or permanent scratch pad memory of MPU 100 at the end of the UPDT subroutine will be the updated stop information, i.e. whether the particular stop tab is on or off.

The output light latch subroutine LLL is utilized in connection with the alternative embodiment described hereinabove in connection with FIG. 4 where separate indicator light and tab logic drive signals are desired. In the event that the same drive signals are used for both these functions as illustrated in the embodiment of FIG. 2A–2E the output light latch subroutine may be deleted, or the peripheral logic implemented to ignore the particular output combinations associated with this subroutine, as is the case in the present implementation.

In subroutine LLL the output switch information on port zero output lines $I/O_{0-7}$ of MPU 100 from the scratch pad is directed to inverters 970 to set the indicator light driver latches 981a for illuminating indicator lights 4. Latches 981a will be enabled when the switchlatch address output information is present on port 1 of MPU 100 to produce latch enable signals $L_{0-15}$.

The crescendo CSN subroutine determines whether additional stops should be activated in response to the setting of the crescendo shoe. As will be explained in more detail hereinafter, a previous scan has determined the setting of the crescendo shoe, and stored this information in register 0 of MPU 100. This number is then compared with the entries in the crescendo and sforzando data table SCFT, and if the sum of the crescendo shoe position value stored in register 0 and the nibble value listed in the SCFT table (see Appendix B) associated with a particular group of stop tabs is greater than 15, that particular stop will be selected. For example, if the value stored in register 0 of MPU 100 is 6 (H'06), stop 2 in the first group of eight stops, and stops 8, 13 and 14 in the second group of eight stops, each having a nibble value greater than 9 (H'09) will be selected. Consequently, each byte of data contains the information defining whether any of eight stops associated with that group are to be on or off. Similarly, if the crescendo shoe is closed, such that the value stored in register 0 is zero, no stops will be selected. When the crescendo shoe is fully open, corresponding to a register 0 value of H'OF, of all the stops having associated values equal to or greater than one will be selected. At this point in the processing the values associated with the sforzando data are ignored.

In addition to the stops selected corresponding to the particular crescendo shoe setting, the appropriate crescendo lights will be illuminated as described hereinabove. In the example where the value in register 0 corresponding to the crescendo shoe position is H'06, crescendo lights 1 and 2 will be illuminated. When the stop information has been assembled in this manner, it is loaded into a scratch pad register pointed to by the ISAR so that the stop information is available for use by the voice latches to turn on the desired stops.

In the output voice latch subroutine OVL, the contents of register 1 are examined to determine if the sforzando controls have been activated. If so, the sforzando portions of the crescendo and sforzando data table SCFT are combined with the information pertaining to the crescendo and selected stop tab information, and provided as outputs from port zero of MPU 100 to latches 980. For example, the sforzando data entry H'FF in the SCFT table indicates that all of stops 0–7 will be selected. Similarly, the entry H'73 indicates that stops 8, 9, , 12, 13 and 14 will be selected, the least significant bit corresponding to stop number 8 and the most significant bit corresponding to stop number 15. At the same time, the SFZ indicator will be illuminated when $D_{4-7}=0001$ and latch enable signal $L_{15}$ is high.

In the alternative embodiment described hereinabove, where separate light and voice latches are utilized, only the voice latches will be addressed during this phase of the program. The appropriate enable signals $L_{0-15}$ are then produced through switch and latch decoder circuit 800 from port 1 of MPU 100 to latch the information into latch circuits 980, thereby illuminating the indicator lights and activating the appropriate tab logic circuits. Following completion of the output voice latch subroutine, the program returns to the INC increment select routine where the S select value S is incremented, and the next series of switches responding to $\overline{S}_1$, for example, are interrogated. This procedure is repeated subsequently for the stop tab switches responding to switch scan signals $\overline{S}_{0-10}$.

As indicated above, when the select value reaches S=11, the INC subroutine branches through intermediate branch point BPRI to the piston switch initialization subroutine PR1. Initially, when the branch occurs to this subroutine at S=11, the toggle bit will be set, so that no relative branch occurs to the PS3 subroutine, and the PR1 routine is executed. As can be seen, the starting address for RAM 500 is stored in register H, the starting address of the division table DT is stored in the data counter, and the starting address of the crescendo and pedal routine CSNP is stored in register $K_L$. Consequently, the described registers are intialized to point to the address of the proper tables so that these tables may be accessed at a later time. It will also be observed that for S=12 through S=14, the toggle bit will be reset, so that a branch will occur directly to the PS3 subroutine.

The cancel and division piston switch routine PS3 determines whether cancel or divisional pistons have been operated. Initially, if a piston has been previously operated, the routine branches to the increment select INC routine where S is incremented and the next group of switches examined. However, if a piston has not previously been operated, the piston data is examined to determine if the operation relates to a cancel piston (indicated by bit 7) or a divisional piston (indicated by bits 6-0).

If this subroutine finds that a cancel piston has been operated, a branch is made to the initialize stop number ISN subroutine which immediately cancels all stops associated with that cancel piston. In addition, the starting address of the cancel routine ACR replaces the starting address of the crescendo and pedal routine CSNP and register $K_L$.

If it is determined that no cancel pistons have been operated, the program proceeds to examine sequentially bits 6-O to determine if any divisional pistons are closed, as determined by the total number of pistons defined in table DT. If a divisional piston has been operated, the address of the operate routine AOR replaces the address of the crescendo and pedal routine in register $K_L$. However, the operate routine is not executed immediately until it is determined whether the SET control has been activated. Processing then returns to the INC routine where the select S value is incremented and the next set of switch conditions examined.

If neither cancel nor divisional pistons have been operated, the PS3 routine updates the pointer registers, and returns control to the INC subroutine.

When all of the stop tabs, divisional pistons and cancel pistons have been scanned, such that S=15, the INC subroutine branches to the crescendo pedal routine CSNP, which reads the position of the crescendo shoe and converts this information to a number between zero and fifteen which is stored in register O. Consequently, the described implementation of the present invention provides for sixteen discrete crescendo shoe positions. It will be understood, however, that more steps may be added, if desired, by increasing the count range of register O and the comparison criteria for the values in the SCFT table. In order to prevent erroneous indication in the event that the crescendo shoe is positioned near the dividing line of particular stop tab groups, the present position of the crescendo shoe as stored in register O is based on the previous position detected of the crescendo shoe with a small amount of hysteresis added. For example, in the embodiment illustrated, the contents of register O indicating the past position of the crescenndo shoe is moved to register 4 which is used as a counting register. The value of the crescendo shoe position is shifted left four bits and added to a fixed constant H'70. As explained in more detail hereinabove, when the interrupt control bit $\overline{ICB}$ is produced, capacitor Cl of crescendo circuit 400 begins charging until the voltage threshold established on the base of transistor Q2 is reached, whereupon the $\overline{EXT\ INT}$ signal is applied to static memory interface 300. As noted, the time delay between the $\overline{ICB}$ signal and the $\overline{EXT\ INT}$ signals will be determined by the setting of the crescendo shoe which determines the resistance of variable resistor R11.

During the time that caapictor C1 is charging, register 4 is being decremented. However, the $\overline{EXT\ INT}$ signal causes static memory interface 300 to produce an INT REO signal to MPU 100, which in turn causes the microprocessor to generate an interrupt, causing the CSNP subroutine to immediately jump to program label IV. At this point, the contents of register 4 are shifted left one bit, an AND operation is performed with H'FO, and the resulting number returned to register O, representing the present position of the crescendo shoe, with hysteresis added. As soon as the internal interrupt is produced, capacitor C1 is discharged. As noted above, the contents of register O indicating the current position of the crescendo shoe, is used with the crescendo and sforzando table SCFT to determine which stops should be activated for the particular crescendo shoe setting. It will be understood that other methods of producing a digital number corresponding to the position of the crescendo shoe may also be used within the scope and principle of the present invention. At the conclusion of the crescendo pedal routine, the program branches to the sforzando piston subroutine FS2.

The sforzando piston routine FS2 examines the condition of the sforzando piston. The sforzando piston information is included as bit 7 in register 2. If the toggle bit previously produced is a 1, register 1 (which stores the sforzando piston condition information) will indicate that the sforzando piston has been operated. The toggle bit wll be set only during the scan when the sforzando piston is first detected closed, in order to eliminate possible switch bounce.

The reversible piston subroutine R1 examine bits 6-O to determine whether any reversible pistons have been operated. As described hereinabove, although the exemplary program described and illustrated makes provision for seven reversible pistons, the system is implemented with only a single reversible (GREAT TO PEDAL). If a reversible piston has not been operated, the program branches to the set piston routine SPR. If the reversible piston subroutine finds that the toggle bit in one of bit positions 6-O has been set, indicating the associated piston is closed, the reversible table SRT is consulted for the stop number associated with that reversible piston, and this information stored in register 4. The starting address of the reverse subroutine ARR is also stored in register $K_L$. If it is determined that a reversible piston has been operated, reversible piston program then branches to the stop bit pointer routine SBP and the ON-OFF condition of the stop is reversed in scratch pad.

The set piston routine SPR determines whether the set piston has been operated. Initially, the contents of register $K_L$ are compared with the address of the operate routine AOR to determine whether a divisional piston has previously been activated. If a divisional piston has not been activated, the routine branches to the light initialization routine LI. Subroutine LI initializes the data counter to the starting address of light table LT which indicates which indicator lights are to be illuminated, and also initializes the scratch pad memory to indicate that the same rountine is to be used that produced information for the stops. The exit of the LI routine is to the output light latch subroutine LLL.

If the set piston routine determines that an operate piston has been activated, a test is made to see if the set point has been operated. This is accomplished by examining bit 7 of register 3. If this bit is not set, the address in register $K_L$ is changed from the starting address of the reverse routine ARR to the starting address of the set routine ASR, and the program continues with the personal combination routine PC. If bit 7 of register 3 is set, the set piston routine branches directly to the personal combination routine PC.

The personal combination routine PC determines if a personal combination switch has been operated. Although the present program makes provision for seven personal combination switches, the system as implemented only includes one such control. However it will be understood that additional personal combination switches may be added, as desired, with corresponding augmentation of RAM 500. In this routine, bits 6-0 of register 3 are sequentially examined to determine if a personal combination switch has been operated. If none of the personal combination switches is detected closed, the routine immediately branches to the initialize stop number routine ISN. However, if a personal combination switch is detected closed, a number corresponding to the total number of memory locations required by one personal combination switch is added to the contents of the H registers where the starting address of permanent memory or RAM 500 has been stored. In the present example, a personal combination switch requires 224 memory locations (H'EO). Consequently, if additional personal combination switches are desired, additional blocks of RAM memory of this size may be added as required.

The initialize stop number routine ISN is entered from the cancel, operate or set routines. In this program, each stop is tested to determine if it lies in the particular division under consideration. As noted above, the Q register contains information relating to the stop numers in particular divisions from the DT table. Each stop number is compared sequentially with this information to determine if it lies within the particular division. If the stop is not within that division, the stop number is incremented and the process repeated. If the stop number is in the particular division, the program continues with the stop bit pointer SBP subroutine. When all of the stops have been examined in this manner, control is returned to the increment select INC routine.

The stop bit pointer SBP subroutine locates the particular stop bit in the scratch pad memory so that that particular stop may be cancelled, set or operated, depending upon the particular piston which has been activated. Consequently, at the completion of this subroutine, the ISAR points to the scratch pad register containing the information relating to the stop initialized during the ISN subroutine. It will also be observed that at the conclusion of the stop bit pointer routine, the program counter is loaded with the contents of the $K_L$ register, as previously described. Consequently, if a cancel piston had been operated, the program counter will be loaded with the cancel ACR routine. Similarly, if a divisional piston has been operated or the set piston closed, the corresponding operate routine AOR or set routine ASR, respectively, will be loaded from the $K_L$ register into the program counter.

Assuming that a cancel piston has been operated, the cancel subroutine will be called to set the particular stop pointed to by the ISAR off, thereby cancelling that stop. At the conclusion of this subroutine, the updated condition of the stop is returned to the scratch pad memory, and the program branches back to DIV, that portion of the initialize stop number routine incrementing the stop number and testing whether the new stop number lies within the particular division.

If previously a divisional piston had been operated, indicating that information is to be recalled from permanent memory RAM 500, the program counter will contain the starting address of the operate AOR routine which reads the contents of RAM 500 and loads that information into the position in the scratch pad memory pointed to by the stop tab pointer. Consequently, this routine is similar to the cancel routine, except that the stop data is set to the value in permanent memory, rather than zero. At the conclusion of this subroutine, control is returned to the incrementing and test portion of the initialize stop number routine.

If a set piston was detected closed, the operate routine was changed to the set routine ASR and stored in the program counter. The ASR subroutine reads the information in the scratch pad location pointed to by the stop bit pointer and stores the information in permanent memory RAM 500. Consequently, the RAM now contains information relating to the stops that are on.

Finally, in the event the reversible piston is activated, the contents of the program counter will contain the starting address of the reverse routine ARR. Since this program operates only on a single stop, the incrementing and testing functions of the ISN routine are not used. Fundamentally, this routine insures that the particular stop bit pointed to by the stop bit pointer is inverted, which causes that particular stop's position to be reversed. The updated status of this stop is then placed into the scratch pad memory.

A typical operating sequence for the capture combination action of the present invention may now be described. Initially, it is assumed that the system has stabilized after power turn-on through initializing circit 700 and that all tabs and pistons are open. It will further be assumed that the crescendo shoe is in the fully up or closed position.

To illustrate the flow of events, assume that a single organ voice tab, such as the PRINCIPAL 8' (GREAT), has been selected by depressing the stop tab, thereby closing the ON contacts of switch 1a. As the system program stored in PROM 200 advances, scanning the various stop tabs and other controls, the select value will eventually be incremented to $S=3$, resulting in an output address on switch-latch address output port lines $I/O_{10-13}$ of 0011, which produces a zero on output line $O_4$ of decoder circuit 801, causing switch scan signal line $\bar{S}_3$, which checks the set condition (either on or off) of the group of tabs that include PRINCIPAL 8', to be a zero. The $\bar{S}_3$ bus, through diode D2 and the closed upper switch contacts, sets the ON stop tab bus $A_4$ to the low state, which is applied to the $A_1$ input of multiplexer circuit 952. When the INC subroutine causes switch-latch address output port line $I/O_{14}$ to be high, the $A_4$ data is selected by switch selector multiplexer 952 and appears on output terminal $D_1$ to form bidirectional port 0 latch information data $I/O_{04}$ through the buffer AND gate 968. At this point, latch enable signal $L_4$ is not present to set latch circuit 981.

The information relating to the $A_4$ data is stored in the appropriate pair of scratch pad registers as 0001 0000. As explained hereinabove, if no further $A_4$ or $B_4$ switch closures occur, indicating that the switch has not been reactivated or that switch bounce is not present, these scratch pad registers successively decrement to 10, 01, and finally to the 00 state. As noted, if during any of these successive scans, the switch contacts are again closed, the scratch pad registers will be set to 11, and the decrementing process will repeat. The $A_4$ data is sent on line $I/O_{04}$ as data signal $D_4$, via inverter stage 975.

In the implementation described where only a single set of bistable latches 981 is used (i.e. the same control signals are used for the indicator lights and the tab logic control circuits), the output light latches LLL subroutine is ignored by the processing, and $I/O_{17}$ line enabled to permit the $L_4$ latch enable signal to appear on the enable terminals of latch circuits 981. This action causes the $D_4$ data to be latched into the latch circuit, thereby causing indicator lamp 4a to be illuminated and the $L_3L_4$ tab logic circuit line to be activated to cause the appropriate organ voicing to be turned on. This condition will subsist until a cancelling operation is performed.

In the event that stop tab 1a is moved in the opposite direction to cancel the stop, a similar sequence of events takes place with the $B_4$ data being stored in the appropriate scratch pad register 3, and eventually latched into latch circuits 981 to extinguish indicator light 4a and disable tab logic circuit line $L_3D_4$.

If the performer wishes to store a particular combination of stops, this information is stored in RAM 500, and may be recalled by depressing the appropriate piston. For example, in the example given above where the PRINCIPAL 8' stop tab is depressed, and the performer wishes to recall this particular combination at a later time, the GREAT 1 piston and the SET piston may be depressed. In this case, it will be recalled from Table 1 that the GREAT pistons are associated with switch scan lines $\bar{S}_{12}$ and the set piston is associated with switch scan line $\bar{S}_{15}$. Consequently, when the INC subroutine increments the select S value to 12, the program branches to piston switch initialization subroutine PR1. The division piston switch routine PS3 determiens that a divisional piston has been operated, and the address of the operate routine AOR replaces the address of the crescendo and pedal routine in register $K_L$. As noted, however, the operate routine is not executed immediately until it is determined whether the SET control has been activated. Since this is the case, nothing furthers occurs until the select value has been incremented to $S=15$. At this point, the INC program branches through the crescendo pedal routine, the sforzando piston routine, and the reversible piston routine to the set piston routine SDR. As described above, the contents of register $K_L$ are compared with the address of the operate routine AOR to determine whether a divisional piston has previously been operated. Since this is the case, and bit 7 of register 3 is set indicating that the set piston has been operated, the address in register $K_L$ is changed to the starting address of the set routine ASR. This subroutine reads the information in the scratch pad location pointed by the stop bit pointer and stores the information relating to the stop tab activated, namely stop tab 1a, in RAM 500, where the information will remain until cancelled or otherwise modified.

If at a later time the performer wishes to recall this particular combination of stops, the GREAT 1 piston may be activated, which recalls the stored data from RAM 500 to activate the appropriate indicator lights and tab logic circuit lines. This sequence of events again occurs when the select value is incremented to $S=12$, and the operate subroutine is executed. As noted hereinabove, this program sets the stop data to the value stored in RAM 500, to recall this information from permanent memory. At the conclusion of this subroutine, control is returned to the increment and test portion of the initialize stop number routine. It will be observed that the stop tabs are not physically moved under the control of the combination capture action of the present invention. Rather, the stop tab switches remain in the center neutral position, while a visual indication is provided by the indicator light associated with each stop tab. Furthermore, the appropriate enabling signals are provided to the stop tab logic circuits for producing the appropriate organ voicing. Consequently, the large amount of unnecessary electrical energy required by other types of electro-mechanical combination actions, as well as the associated acoustical noise when a number of stop tabs are actuated, is completely eliminated.

As described hereinabove, a similar sequence of events occurs when a cancel piston is operated. For example, in the example under consideration, when the GREAT cancel piston is operated, the cancel subroutine will be entered when the value of select is incremented to S=12. A branch is then made to the initialize stop number subroutine which immediately cancels all stops associated with that cancel piston. Consequently, the data associated with stop tab 1a which was stored in RAM 500 will be cleared from permanent memory.

As described hereinabove, a particular set of stop tab combinations may be set and stored in RAM 500 through the use of the personal combination switch. This operation is similar to that described hereinabove in connection with the divisional pistons, except that the personal combination PC subroutine is utilized.

If the sforzando piston has been operated, the INC subroutine will branch to the sforzando piston subroutine FS2 when the value of select is incremented to S=15. When the sforzando control is operated, the value H'FF is stored in register 1, which is examined during the execution of the output voice latch subroutine. At this point, the stops associated with the SFZ data listed in the SCFT table are activated and the SFZ light illuminated. When the sforzando control is again closed, the value in register 1 becomes zero and the sforzando function is cancelled.

In the event that the crescendo shoe is activated, a number corresponding to the position of the crescendo shoe will be stored in register 0 as described hereinabove. When the crescendo routine is called, the contents of register 0 is added in turn to each crescendo data value listed in the crescendo and sforzando data table SCFT. If this sum exceeds 15, the particular stop associated with that number is activated. For example, if the number stored in register 0 is H'06, stop numbers 2, 8, 13, 14, and 30 will be actuated, and crescendo light 1a and 2 will be illuminated. Further depressing the crescendo shoe will cause more stops and crescendo lights to be activated. It will be observed that the stop tabs themselves are not physically moved in the present invention, thereby eliminating the additional electrical energy necessary to move stops as in previous designs as well as eliminating acoustical noise associated with the stops as they are actuated.

It will be understood that various changes in the details, materials, steps and arrangements of parts, which have been herein described and illustrated in order to explain the nature of the invention, may be made by those skilled in the art within the principle and scope of the invention as expressed in the appended claims.

APPENDIX A

```
*
* INITIALIZATION
********************
     4000 70           STRT   CLR
     4001 51                  LR    1,A        SFZ OFF
     4002 50                  LR    0,A        CSN OFF
     4003 18                  COM
     4004 B1                  OUTS  1          LAST SELECT
     4005 20 6E               LI    ACR
     4007 05                  LR    KL,A
     4008 20 41               LI    ACR:       ADDRESS OF CANCEL ROUTINE
     400A 04                  LR    KU,A       K=ADDRESS OF CANCEL ROUTINE
     400B 2A 41 A3            DCI   ZERO       CANCEL ALL STOPS
     400E 0E                  LR    Q,DC
     400F 29 41 4E            JMP   ISN
*
* INCREMENT SELECT & ENABLE EA
********************
     4012 A1           INC    INS   1          #1111 SSSS
     4013 1F                  INC              INCREMENT SELECT
     4014 92 05               BNC   INC1       IS S=0
     4016 2A 41 AA            DCI   SCFT       START ADDRESS OF CSN & SFZ TABLE
     4019 70                  LIS   0
     401A 21 0F         INC1  NI    H'0F'      #0000 SSSS
     401C 24 E0               AI    H'E0'      +1110 0000
*                                              =1110 SSSS
     401E B1                  OUTS  1          OUTPUT SELECT & EA
     401F 70                  LIS   0
     4020 B0                  OUTS  0          SET PORT ZERO FOR INPUT
```

```
             *
             * LOAD SWITCHES IN TO REG 2&3
             *********************
             * EXIT:REG 2=A SWITCHES
             *      REG 3=B SWITCHES
             *      ALL ENABLES DISABLED
             *
4021 A0              INS    0
4022 52              LR     2,A
4023 A1              INS    1          *1110 SSSS
4024 24 F0           AI     H'F0'      +1111 0000
4026 B1              OUTS   1          =1101 SSSS
4027 A0              INS    0          TWO CYCLE DELAY
4028 A0              INS    0
4029 53              LR     3,A
402A A1              INS    1          *1101 SSSS
402B 24 20           AI     H'20'      +0010 0000
402D B1              OUTS   1          =1111 SSSS
             *
             * DELAY SWITCH REVERSAL:
             ************************
             * DELAY: AN A OR B SWITCH IS NOT RECOGNIZED FOR THREE
             *        SCANS AFTER THE CORRESPONDING B OR A SWITCH
             *        HAS BEEN OPERATED
             * ENTRY: ACC. & PORT 1=H'FS'
             *        REG 2=A SWITCH SWITCH ON=ZERO
             *        REG 3=B SWITCHES
             * EXIT:  IF SELECT=0 THROUGH 10
             *        REG 2&3=TOGGLE BIT ON FIRST
             *        SWITCH CLOSURE IF THE SWITCH WAS OFF FOR
             *        THE LAST 3 SCANS
             *        IF SELECT=15 REG 2=TOGGLE BIT AND REG 3
             *        IS UNCHANGED.
             *        SWITCH ON TOGGLE BIT=ZERO
             * USED:  REG. 28 THROUGH 51. FOR CONTROL REG.
             *        REG 4 ALTERED
402E 1F              INC
402F 21 0F           NI     H'0F'      ACC=S+1
4031 24 F4           AI     H'F4'
4033 81 7F           BP     BPR1       GO TO DIV. PISTON ROUTINE
             *                         IF SELECT IS GT. THAN 10 & LESS THAN
             *                         15
4035 13              SL     1
4036 24 34           AI     H'34'
4038 0B              LS     IS,A       ISAR=H'1C'+2(S+1)
4039 25 1C           CI     H'1C'      IS S=15?
403B 42              LR     A,2
403C 84 02           BZ     D2         IF S=15 IGNORE B SWITCHES
403E F3              NS     3          COMBINE A AND B SWITCHES
403F 54      D2      LR     4,A
             *                         TEST CONTROL REGISTERS
4040 42              LR     A,2        A SWITCHES
4041 FC              NS     S
4042 ED              XS     I
4043 E2              XS     2
4044 52              LR     2,A
4045 FC              NS     S
4046 EE              XS     D
4047 E2              XS     2
```

```
4048 52              LR    2,A        TOGGLE BIT
4049 43              LR    A,3        B SWITCHES
404A FC              NS    S
404B ED              XS    I
404C E3              XS    3
404D 53              LR    3,A
404E FC              NS    S
404F EE              XS    D
4050 E3              XS    3
4051 53              LR    3,A        TOGGLE BITS. (B SWITCHES IF S=15)
          *                           DECREMENT CONTROL REG.
          *          C1  C0  C1  C0  C1  C0  C1  C0
          * OLD       1   1   1   0   0   1   0   0
          * NEW       1   0   0   1   0   0   0   0
4052 4D       D3     LR    A,I        LOAD OLD C0
4053 FE              NS    D          NEW C1=OLD C0 & OLD C1
4054 56              LR    6,A        SAVE NEW C1
4055 4D              LR    A,I        LOAD OLD C0
4056 18              COM
4057 FE              NS    D          NEW C0=NOT OLD C0 & OLD C1
4058 5D              LR    I,A        NEW C0 TO SCRATCH PAD
4059 46              LR    A,6
405A 5E              LR    D,A        NEW C1 TO SCRATCH PAD
          *                           SET CONTROL REGISTERS.
405B 4C              LR    A,S        CONTROL REG C0
405C 18              COM
405D F4              NS    4
405E 18              COM
405F 5D              LR    I,A        CONTROL REG C0 SET
4060 4C              LR    A,S        CONTROL REG C1
4061 18              COM
4062 F4              NS    4
4063 18              COM
4064 5E              LR    D,A        CONTROL REG C1 SET
4065 0A              LR    A,IS
4066 12              SR    1
4067 24 26           AI    H'26'
4069 0B              LR    IS,A       ISAR=H'34'+(S+1)
406A A1              INS   1
406B 18              COM
406C 84 48           BZ    CSNP       GO TO SFZ PISTON IF S=15
          *
          * UPDATE SCRATCH PAD
          ********************
          * ENTRY: REG2=STOP ON
          *        REG3=STOP OFF
          *        ISAR=H'34'+(S+1)
406E 42       UPDT   LR    A,2
406F FC              NS    S          SET ON
4070 18              COM
4071 F3              NS    3          SET OFF
4072 18              COM
4073 5C              LR    S,A        SCRATCH PAD UPDATED
          *
          * OUTPUT LIGHT LATCHES
          ********************
4074 4C       LLL    LR    A,S
4075 B0              OUTS  0
4076 A1              INS   1          *1111 SSSS
```

```
4077 24 C0              AI      H'C0'       +1100 0000
4079 B1                 OUTS    1           =1011 SSSS
407A 24 40              AI      H'40'       +0100 0000
407C B1                 OUTS    1           =1111 SSSS
              *
              * CSN
              ********************
              * ENTRY: Q,Q+1,Q+2,& Q+3 POINT TO CSN DATA
              *        Q+4 POINTS TO FSN DATA
              *        IF REG.0=H'0X', ALL CSN STOPS OFF
              *        IF REG.0=H'FX', ALL CSN STOPS ON
              * EXIT:  CSN IN ACC & S, ISAR=O'37'
              *        DCO POINTS TO FSN DATA
407D 0E                 LR      Q,DC
407E 74                 LIS     4
407F 8E                 ADC
4080 62                 LISU    2
4081 6F                 LISL    7           ISAR=H'10'
4082 20 F0              LI      H'F0'
4084 F0                 NS      0
4085 20 FF              LI      H'FF'
4087 84 17              BZ      CSN5
4089 0F                 LR      DC,Q
408A 16       CSN1      LM
408B 5D                 LR      I,A         4 M.S.B. CSN INTO 4 M.S.B. OF S
408C 15                 SL      4
408D 5D                 LR      I,A         4 L.S.B. CSN INTO 4 M.S.B. OF S
408E 8F FB              BR7     CSN1
4090 4C       CSN2      LR      A,S
4091 C0                 AS      0           CSN IN 4M,S,B
4092 70                 CLR                 STOP ON=ZERO, STOP=ONE
4093 82 03              BC      CSN4
4095 20 80              LI      H'80'
4097 5D       CSN4      LR      I,A
4098 8F F7              BR7     CSN2
409A 4C                 LR      A,S
409B 12       CSN3      SR      1           #0XXX XXXX
409C CD                 AS      I
409D 8F FD              BR7     CSN3
409F 5C       CSN5      LR      S,A         ASSEMBLE CSN BYTE
              *
              * OUTPUT VOICE LATCHES
              ********************
              * ENTRY : LIGHT DATA ON PORT 0
              *         REG 0=CSN LEVEL
              *         CSN DATA IN REG S
              *         DCO POINTS TO SFZ DATA
              *         ONE IN DATA TABLE=STOP ON
              *         IF FSN IS ON, REG 1=H'FF'
              * EXIT :  VOICE LATCHES LOADED
              *         Q UPDATED
40A0 16       OVL       LM                  SFZ DATA
40A1 0E                 LR      Q,DC
40A2 F1                 NS      1           IS SFZ ON
40A3 18                 COM
40A4 54                 LR      4,A
40A5 A0                 INS     0           LIGHT DATA
40A6 F4                 NS      4           COMBINE WITH SFZ
40A7 FC       OPT       NS      S           COMBINE WITH CSN
```

```
40A8 B0                  OUTS  0           DATA TO VOICES
40A9 A1                  INS   1           #1111 SSSS
40AA 24 80               AI    H'80'       +1000 0000
40AC B1                  OUTS  1           =0111 SSSS LOAD LATCHES
40AD 24 80               AI    H'80'       +1000 0000
40AF B1                  OUTS  1           =1111 SSSS
40B0 29 40 12            JMP   INC
40B3 90 22     BPR1      BR    PR1
               *
               * CRESENDO PEDAL ROUTINE
               *******************
40B5 20 40     CSNP      LI    IV:
40B7 BC                  OUTS  H'C'        INTERRUPT VECTOR UPPER
40B8 20 C6               LI    IV
40BA BD                  OUTS  H'D'        INTERRUPT VECTOR LOWER
40BB 71                  LIS   1
40BC BE                  OUTS  H'E'        ENABLE INTERRUPT CONTROL PORT
40BD 40                  LR    A,0
40BE 14                  SR    4
40BF 24 70               AI    H'70'
40C1 54                  LR    4,A
40C2 1B                  EI                ICB STARTS CAPACITOR CHARGING
40C3 34        CP1       DS    4
40C4 94 FE               BNZ   CP1
40C6 1A        IV        DI                INTERRUPT ENTRY
40C7 44                  LR    A,4
40C8 13                  SL    1
40C9 21 F0               NI    H'F0'
40CB 50                  LR    0,A
40CC 90 46               BR    FS2
               *
               * LIGHT INITIALIZATION
               ********************
40CE 20 FF     LI        LI    H'FF'
40D0 5C                  LR    S,A         SET SCRATCH PAD H'34', SFZ&CSN LIGHTS
40D1 2A 41 A5            DCI   LT
40D4 90 9F               BR    LLL
               *
               * PISTON SWITCH INITIALIZATION
               *******************
40D6 94 0C     PR1       BNZ   PS3
40D8 2A 04 00            DCI   PMS         START OF PERMANENT MEMORY
40DB 11                  LR    H,DC
40DC 2A 41 E1            DCI   DT          START OF D.V. TABLE
40DF 20 B5               LI    CSNP        ADDRESS OF CSN PEDAL ROUTINE
40E1 2C                  XDC               DCI POINTS TO START OF D.V. TABLE
               *                           (# PISTON)
40E2 05                  LR    KL,A
               *
               * CANCEL & DIV PISTON SWITCH ROUTINE
               ********************
               * ENTRY : DC1 POINTS TO # PISTONS IN DIV
               *         DC1+1 POINTS TO STARTING STOP # OF DIV
               *         DC1+2 POINTS TO # OF STOPS IN DIV
               *         H INITIALIZED TO START OF P.M.
               * EXIT  : IF PISTON SWITCH IS CLOSED
               *         K=ADDRESS OF CANCEL OR OPERATE ROUTINE
               *         Q POINTS TO STARTING STOP # OF DIV
               *         H=ADDRESS OF P.M.
```

```
                  *       IF NO PISTON SWITCH IS CLOSED:
                  *       DC1 POINTS TO # OF PISTONS IN NEXT DIV
                  *       K IS UNCHANGED
                  *       H IS INCREASED BY # OF PISTON  TIMES
                  *       # OF STOPS IN DIV
40E3 01      PS3  LR   A,KL
40E4 25 B5        CI   CSNP    HAS A PISTON BEEN OPERATED PREVIOUSLY
40E6 94 47        BNZ  JINC
40E8 2C           XDC          DC POINTS TO # PISTONS IN DIV
40E9 16           LM           NUMBER OF PISTONS IN DIV
40EA 0E           LR   Q,DC    Q POINTS TO FIRST STOP IN DIV
40EB 54           LR   4,A     COUNT REG
40EC 16           LM           STARTING STOP # (INCREMENT DC)
40ED 16           LM           # STOPS IN DIV
40EE 55           LR   5,A     REG 5= # STOPS IN DIV
40EF 2C           XDC          DC1 POINTS TO # PISTONS IN NEXT DIV
40F0 42           LR   A,2     SWITCH INFORMATION
40F1 F2           NS   2       SET STATUS REG
40F2 91 0A        BM   PS4     PROCEED IF CANCEL
40F4 20 6E        LI   ACR     ADDRESS OF CANCEL ROUTINE
40F6 05           LR   KL,A    K=ADDRESS OF CANCEL ROUTINE
40F7 90 56        BR   ISN     GO CANCEL
40F9 10      PS2  LR   DC,H
40FA 45           LR   A,5     # STOPS IN DIV
40FB 8E           ADC          ADD # OF STOPS
40FC 11           LR   H,DC    # OF STOPS ADDED TO H
40FD 34      PS4  DS   4       HAVE ALL PISTONS BEEN CHECKED
40FE 91 0B        BM   PS5
4100 42           LR   A,2     SWITCH INFORMATION
4101 13           SL   1       NEXT SWITCH
4102 52           LR   2,A     SAVE
4103 91 F5        BM   PS2     PROCEED IF DIV PISTON CLOSED
4105 20 78        LI   AOR     ADDRESS OF OPERATE ROUTINE
4107 05           LR   KL,A    K=ADDRESS OF OPERATE ROUTINE
4108 90 25        BR   JINC
410A 43      PS5  LR   A,3
410B F3           NS   3
410C 84 21        BZ   JINC
410E 52           LR   2,A     IF NOT TRANSFER TO REG 2
410F 70           CLR
4110 53           LR   3,A     REG 3= ZERO
4111 90 D1        BR   PS3
             *
             * SFZ PISTON
             *******************
             * ENTRY: REG 2=TOGGLE BYTE
             * EXIT : REG 1=H'00' FOR SFZ OFF
             *        REG 1=H'FF' FOR SFZ ON
4113 42      FS2  LR   A,2
4114 18           COM
4115 52           LR   2,A     TOGGLE BIT=ONE
4116 70           CLR
4117 BE           OUTS H'E'    CLEAR INTERRUPT CONTROL PORT
4118 81 02        BP   FS1
411A 18           COM
411B E1      FS1  XS   1       REG 1=H'FF' IF SFZ IS ON
411C 51           LR   1,A
             *
             * REVERSIBLE PISTON
             *******************
```

```
* ENTRY : REG 2=TOGGLE BYTE
411D 2A 41 F9        DCI   SRT    DC=START OF REV TABLE
4120 42         R1   LR    A,2
4121 13              SL    1
4122 52              LR    2,A
4123 84 0D           BZ    SPR    GO TO SET PISTON ROUTINE
4125 16              LM           LOAD STOP NUMBER OXXX XYYY
4126 81 F9           BP    R1     TRY AGAIN
4128 54              LR    4,A    SAVE STOP #
4129 20 74           LI    ARR
412B 05              LR    KL,A   REG K POINTS TO ADDRESS OF REVERSE ROUTINE
412C 90 2F           BR    SBP    STOP BIT POINTER
412E 29 40 12   JINC JMP   INC
*
* SET PISTON ROUTINE
*******************
4131 01         SPR  LR    A,KL
4132 25 78           CI    AOR    ADDRESS OF OPERATE ROUTINE
4134 94 99           BNZ   LI     GO LIGHT CSN & SFZ LIGHTS
4136 43              LR    A,3    IF DIV PISTON HAS BEEN OPERATED
4137 18              COM          PROCEED TO CHECK SET PISTON
4138 53              LR    3,A
4139 81 04           BP    PC
413B 20 89           LI    ASR    ADDRESS OF SET ROUTINE
413D 05              LR    KL,A   CHANGE TO SET ROUTINE
*
* PERSONAL COMBINATIONS
*********************
413E 43         PC   LR    A,3
413F 13              SL    1
4140 53              LR    3,A
4141 84 0C           BZ    ISN
4143 4B              LR    A,11   ADD N TO PM ADDRESS
4144 24 E0           AI    H'E0
4146 5B              LR    11,A
4147 4A              LR    A,10
4148 19              LNK
4149 24 01           AI    H'01
414B 5A              LR    10,A
414C 90 F1           BR    PC
*
* INITIALIZE STOP NUMBER
*******************
* EXIT : REG 4=H'FF
414E 70         ISN  CLR
414F 54              LR    4,A    INITIALIZE STOP # TO H'FF
4150 34              DS    4
*
* STOPS IN DIVISION
*******************
* ENTRY : REG 4=STOP # LESS ONE
*         Q POINTS TO FIRST STOP IN DIV
*         Q+1 POINTS TO # STOPS IN DIV
* EXIT  : Q IS UNCHANGED
*         IF STOP # IS LESS THAN FIRST STOP #
*         OF DIV., REG 4 IS INCREMENTED UNTIL
*         IT IS EQUAL TO FIRST STOP #.
*         IF STOP # IS IN DIV., REG 4 IS
*         INCREMENTED.
```

```
                    *         IF STOP # IS GREATER THAN LAST
                    *         STOP #, PROGRAM BRANCHES OUT.
4151 44             DIV   LR    A,4      STOP #
4152 1F             DIV1  INC            INCREMENT STOP #
4153 54                   LR    4,A
4154 0F             DIV2  LR    DC,Q
4155 18                   COM
4156 88                   AM
4157 81 FA                BP    DIV1
4159 88                   AM
415A 91 D3                BM    JINC
                    *
                    * STOP BIT POINTER
                    *******************
                    * ENTRY : REG 4=STOP #
                    * EXIT  : ISAR POINTS TO STOP GROUP
                    *         REG 2=STOP BIT POINTER
415C 77             SBP   LIS   7        *0000 0111
415D F4                   NS    4        EXTRACT BIT # FROM STOP #
415E 52                   LR    2,A      COUNT REGISTER
415F 44                   LR    A,4      STOP #
4160 13                   SL    1
4161 14                   SR    4
4162 24 35                AI    H'35'
4164 0B                   LR    IS,A     ISAR POINTS TO STOP GROUP.
4165 71                   LIS   1        *0000 0001
4166 90 02                BR    SBP2
4168 13             SBP1  SL    1
4169 32             SBP2  DS    2
416A 81 FD                BP    SBP1
416C 52                   LR    2,A      STOP BIT POINTER IN REG 2&ACC.
416D 0C                   PK
                    *
                    * CANCEL
                    *******************
                    * ENTRY : ACC AND REG 2=STOP BIT POINTER
                    *         ISAR POINTS TO STOP GROUP.
                    * EXIT  : STOP TURNED OFF IN SCRATCH PAD.
416E FC             ACR   NS    S
416F EC                   XS    S
4170 E2                   XS    2        SET STOP OFF
4171 5C                   LR    S,A
4172 90 DE                BR    DIV
                    *
                    * REVERSE
                    *******************
                    * ENTRY : ACC=STOP BIT POINTER
                    *         ISAR POINTS TO STOP GROUP
                    * EXIT  : STOP REVERSED IN SCRATCH PAD.
4174 EC             ARR   XS    S
4175 5C                   LR    S,A
4176 90 B7                BR    JINC
                    *
                    * OPERATE
                    *******************
                    * ENTRY : H POINTS TO PM
                    *         ISAR POINTS TO STOP GROUP IN SCRATCH PAD
                    *         REG 2=STOP POINTER BIT
                    * EXIT  : STOP IN SCRATCH PAD SET=STOP IN PM
```

```
4178 10         AOR    LR    DC,H
4179 70                CLR
417A 8C                XM                 TEST PM BIT
417B 42                LR    A,2          STOP POINTER BIT
417C 91 05             BM    AOR1
417E 18                COM
417F FC                NS    S            SET TO ZERO
4180 90 04             BR    AOR2
4182 FC         AOR1   NS    S
4183 EC                XS    S
4184 E2                XS    2
4185 11         AOR2   LR    H,DC
4186 5C                LR    S,A
4187 90 C9             BR    DIV
                *
                * SET
                ********************
                * ENTRY : H POINTS TO PM
                *         ISAR POINTS TO STOP GROUP IN SCRATCH PAD
                *         REG 2=STOP POINTER BIT
                * EXIT  : STOP IN PM SET=STOP IN SCRATCH PAD
4189 10         ASR    LR    DC,H
418A 42                LR    A,2          STOP POINTER
418B FC                NS    S            TEST STOP BIT
418C 70                CLR
418D 84 02             BZ    S1
418F 18                COM
4190 17         S1     ST                 SET PM
4191 11                LR    H,DC
4192 90 BE             BR    DIV

APPENDIX B
                *
                * DATA TO CANCEL ALL STOPS WHEN FIRST TURNED ON
                ********************
41A3 00         ZERO   DC    H'00'    FIRST STOP
41A4 58                DC    H'58'    ALL 88 STOPS
                *
                * DATA FOR CSN & SFZ INDICATOR LIGHTS
                ********************
41A5 FC         LT     DC    H'FC'    CSN LIGHTS #1&2
41A6 84                DC    H'84'    CSN LIGHTS #3&4
41A7 10                DC    H'10'    CSN LIGHTS #5&6
41A8 00                DC    H'00'    CSN LIGHTS #7
41A9 80                DC    H'80'    SFZ LIGHT
                *
                * CSN & SFZ DATA
                ********************
41AA 47         SCFT   DC    H'47'    STOPS 0&1 CSN DATA
41AB D6                DC    H'D6'    STOPS 2&3 CSN DATA
41AC 93                DC    H'93'    STOPS 4&5 CSN DATA
41AD 20                DC    H'20'    STOPS 6&7 CSN DATA
41AE FF                DC    H'FF'    STOPS 0-7 SFZ DATA
41AF E0                DC    H'E0'    STOPS 8&9 CSN DATA
41B0 00                DC    H'00'    STOPS 10&11 CSN DATA
41B1 0A                DC    H'0A'    STOPS 12&13 CSN DATA
41B2 B0                DC    H'B0'    STOPS 14&15 CSN DATA
41B3 73                DC    H'73'    STOPS 8-15 SFZ DATA
41B4 86                DC    H'86'    STOPS 16&17 CSN DATA
```

```
41B5 05              DC     H'05'     STOPS 18&19 CSN DATA
41B6 02              DC     H'02'     STOPS 20&21 CSN DATA
41B7 00              DC     H'00'     STOPS 22&23 CSN DATA
41B8 FB              DC     H'EB'     STOPS 16-23 SFZ DATA
41B9 00              DC     H'00'     STOPS 24&25 CSN DATA
41BA 00              DC     H'00'     STOPS 26&27 CSN DATA
41BB 68              DC     H'68'     STOPS 28&29 CSN DATA
41BC C0              DC     H'C0'     STOPS 30&31 CSN DATA
41BD 78              DC     H'78'     STOPS 24-31 SFZ DATA
41BE 57              DC     H'57'     STOPS 32&33 CSN DATA
41BF 41              DC     H'41'     STOPS 34&35 CSN DATA
41C0 00              DC     H'00'     STOPS 36&37 CSN DATA
41C1 00              DC     H'00'     STOPS 38&39 CSN DATA
41C2 0F              DC     H'0F'     STOPS 32-39 SFZ DATA
41C3 00              DC     H'00'     STOPS 40&41 CSN DATA
41C4 00              DC     H'00'     STOPS 42&43 CSN DATA
41C5 0F              DC     H'0F'     STOPS 44&45 CSN DATA
41C6 00              DC     H'00'     STOPS 46&47 CSN DATA
41C7 68              DC     H'68'     STOPS 40-47 SFZ DATA
41C8 00              DC     0         STOPS 48&49 CSN DATA
41C9 00              DC     0         STOPS 50&51 CSN DATA
41CA 00              DC     0         STOPS 52&53 CSN DATA
41CB 00              DC     0         STOPS 54&55 CSN DATA
41CC 00              DC     0         STOPS 48-55 SFZ DATA
41CD 00              DC     0         STOPS 56&57 CSN DATA
41CE 00              DC     0         STOPS 58&59 CSN DATA
41CF 00              DC     0         STOPS 60&61 CSN DATA
41D0 00              DC     0         STOPS 62&63 CSN DATA
41D1 00              DC     0         STOPS 56-63 SFZ DATA
41D2 00              DC     0         STOPS 64&65 CSN DATA
41D3 00              DC     0         STOPS 66&67 CSN DATA
41D4 00              DC     0         STOPS 68&69 CSN DATA
41D5 00              DC     0         STOPS 70&71 CSN DATA
41D6 00              DC     0         STOPS 64-71 SFZ DATA
41D7 00              DC     0         STOPS 72&73 CSN DATA
41D8 00              DC     0         STOPS 74&75 CSN DATA
41D9 00              DC     0         STOPS 76&77 CSN DATA
41DA 00              DC     0         STOPS 78&79 CSN DATA
41DB 00              DC     0         STOPS 72-79 SFZ DATA
41DC 00              DC     0         STOPS 80&81 CSN DATA
41DD 00              DC     0         STOPS 82&83 CSN DATA
41DE 00              DC     0         STOPS 84&85 CSN DATA
41DF 00              DC     0         STOPS 86&87 CSN DATA
41E0 00              DC     0         STOPS 80-87 SFZ DATA
          *
          * DIVISION TABLE
          *********************
41E1 06        DT    DC     H'06'     NO. PISTONS IN GENERAL DIVISION
41E2 00              DC     H'00'     STARTING STOP # OF GENERAL DIVISION
41E3 30              DC     H'30'     NO. STOPS IN GENERAL DIVISION
41E4 04              DC     H'04'     NO. PISTONS IN PEDAL DIVISION
41E5 00              DC     H'00'     STARTING STOP # OF PEDAL DIVISION
41E6 0C              DC     H'0C'     NO. STOPS IN PEDAL DIVISION
41E7 04              DC     H'04'     NO. PISTONS IN SWELL DIVISION
41E8 0C              DC     H'0C'     STARTING STOP # OF SWELL DIVISION
41E9 10              DC     H'10'     NO. STOPS IN SWELL DIVISION
41EA 04              DC     H'04'     NO. PISTONS IN GREAT DIVISION
41EB 1C              DC     H'1C'     STARTING STOP # OF GREAT DIVISION
41EC 14              DC     H'14'     NO. STOPS IN GREAT DIVISION
41ED 00              DC     H'00'     NO. PISTONS IN DIV E
41EE 00              DC     H'00'     STARTING STOP # OF DIV E
```

```
41EF 00              DC   H'00'    NO. STOPS IN DIV E
41F0 00              DC   H'00'    NO. PISTONS IN DIV F
41F1 00              DC   H'00'    STARTING STOP # OF DIV F
41F2 00              DC   H'00'    NO. STOPS IN DIV F
41F3 00              DC   H'00'    NO. PISTONS IN DIV G
41F4 00              DC   H'00'    STARTING STOP # OF DIV G
41F5 00              DC   H'00'    NO. STOPS IN DIV G
41F6 00              DC   H'00'    NO. PISTONS IN DIV H
41F7 00              DC   H'00'    STARTING STOP # OF DIV H
41F8 00              DC   H'00'    NO. STOPS IN DIV H
          *
          * REVERSIBLE STOP # DATA
          ********************
41F9 0A     SRT      DC   H'0A'    STOP # FOR REV # 6
41FA 00              DC   H'00'    STOP # FOR REV # 5
41FB 00              DC   H'00'    STOP # FOR REV # 4
41FC 00              DC   H'00'    STOP # FOR REV # 3
41FD 00              DC   H'00'    STOP # FOR REV # 2
41FE 00              DC   H'00'    STOP # FOR REV # 1
41FF 00              DC   H'00'    STOP # FOR REV # 0
```

1. A capture combination action system for use in an electronic organ for selecting a predetermined combination of stops to define the organ voicing, said system comprising:
   a. a plurality of stop tabs for setting and resetting said stops, each of said tabs including a switch having a pair of normally open contacts which are momentarily closed to provide an electrical path when said tab is manually actuated by the organist;
   b. a plurality of pistons for setting a desired combination of said stops to a predetermined condition, each of said pistons including a pair of normally open contacts which are closed to provide an electrical path when said piston is actuated;
   c. random access memory means for storing data and for storing the current status of all organ stops associated with a selected combination of stops;
   d. read only memory means containing a permanently stored operating program comprising a plurality of operating instructions; and
   e. processing means responsive to said operating instructions including;
      i. means for continually and sequentially scanning each pair of said stop tab and piston contacts to detect a contact closure;
      ii. means for selecting stops having contacts detected momentarily closed by said scanning means;
      iii. means for storing in said random access memory means data associated with a selected one of said pistons for a selected combination of stops;
      iv. means for recalling from said random access memory means said selected stop combination data when said scanning means detects closure of said selected piston contacts;
      v. means utilizing said recalled data to select said combination of stops and;
      vi. means responsive to said scanning means for continually updating the data stored in said memory means to reflect the current status of all organ stops.

The embodiments of the invention in which an exclusive property or privilege is claimed are as follows:

2. The capture combination action system according to claim 1 wherein said stop tabs include a second pair of normally open contacts which are closed when said stop tab is moved to a second operative position, closure of said first set of contacts operating to set the associated stop, closure of said second set of contacts operating to reset the associated stop.

3. The capture combination action system according to claim 2 wherein said stop tab includes a neutral position in which neither pair of contacts is closed.

4. The capture combination action system according to claim 1 wherein said stop tabs are moved only in response to manual actuation.

5. The capture combination action system according to claim 1 wherein said tabs comprise momentary contact switches having contacts which are closed only as long as said stop tab is manually actuated.

6. The capture combination action system according to claim 1 wherein said operating instructions are operative to cause said procesesing means to continually and sequentially scan each pair of said stop tab and piston contacts to detect a contact closure, and select stops associated with stop tabs having closed contacts, store in said random access memory means data associated with a selected one of said pistons for a selected combination of stops, recall from said random access memory means said selected stop combination data upon closure of said selected piston contacts, and select said combination of stops.

7. The capture combination action system according to claim 1 wherein said processing means includes a microprocessor.

8. The capture combination action system according to claim 1 wherein said processing means includes means for actuating a predetermined combination of stops in response to the contact closure of a designated one of said pistons.

9. The capture combination action system according to claim 8 wherein said actuating means includes a list of said predetermined combinations of stops permanently stored in said read only memory means.

10. The capture combination action system according to claim 1 including a foot operable crescendo shoe having a range continuous of operating positions, said processing means including crescendo circuit means for actuating a plurality of predetermined combinations of said stops in response to the position of said crescendo shoe.

11. The capture combination action system according to claim 10 wherein said crescendo circuit means produces a control signal in response to an instruction of said operating program, said crescendo circuit means including means for producing a delayed control signal in response to said control signal, the delayed time interval between said control signal and said delayed control signal varying with the position of said crescendo shoe, and means for actuating one or more of said plurality of predetermined stop combinations in response to the length of said delay time interval.

12. The capture combination action system according to claim 11 wherein said delayed control signal producing means comprises an R/C timing circuit including a capacitor and a variable resistor, the resistance of said variable resistor corresponding to the position of said crescendo shoe.

13. The capture combination action system according to claim 11 including clock means producing clock pulses and counter means for counting the number of clock pulses occurring during said delayed time interval to define a delayed time reference value, each of said plurality of predetermined stop combinations being associated with a crescendo reference value, and means for comparing said delay time reference value with said crescendo reference value, said comparison means causing actuation of one or more of said plurality of predetermined stop combinations.

14. The capture combination action system according to claim 13 wherein said one or more predetermined stop combinations are actuated when the sum of said delay time reference value and said crescendo reference value exceed a predetermined value.

15. The capture combination action system according to claim 13 wherein said crescendo reference values and the stop combinations associated therewith are permanently stored in said read only memory means.

16. The capture combination action system according to claim 10 including a crescendo indicator light associated with each of said predetermined stop combinations and means for illuminating said crescendo indicator light when said predetermined stop combination is actuated.

17. The capture combination action system according to claim 10 including means for adding hysteresis to the position of said crescendo shoe.

18. The capture combination action system according to claim 17 including means for repetitively scanning the position of said crescendo shoe and means for storing said position, said hysteresis means including means for using said scan position from a previous scan to update the present position of the crescendo shoe.

19. The capture combination action system according to claim 1 wherein a first closure of said stop tab contacts sets the associated stop and a subsequent closure resets the associated stop.

20. The capture combination action system according to claim 1 wherein said scanning means include debounce means for eliminating false contact closures caused by switch bounce.

21. The capture combination action system according to claim 20 wherein said debounce means includes means for requiring that said switch contacts remain in a particular state for a plurality of successive scans before the switch closure will be detected by said scanning means.

22. The capture combination action system according to claim 1 including an indicator light associated with each of said stop tabs, said stop selecting means illuminating indicator lights associated with stop tabs having contacts detected closed by said scanning means, said utilizing means illuminating the associated indicator lights.

23. The capture combination action system according to claim 22 wherein said selecting means includes separate means for selecting stops and illuminating indicator lights.

24. The capture combination action system according to claim 22 wherein said operating instructions are operative to cause said processing means to continually and sequentially scan each pair of said stop tab and piston contacts to detect a contact closure, select stops and illuminate indicator lights associated with stop tabs having closed contacts, store in said random access memory means data associated with a selected one of said pistons for a selected combination of stops, recall from said random access memory means said selected stop combination data upon closure of said selected piston contacts, and select said combination of stops and illuminate the associated indicator lights.

25. The capture combination action system according to claim 22 wherein said processing means includes means for actuating a predetermined combination of stops and associated indicator lights in response to the contact closure of a designated one of said pistons.

26. The capture combination action system according to claim 25 wherein said actuating means includes a list of said predetermined combinations of stops permanently stored in said read only memory means.

* * * * *